(12) United States Patent
Knerr et al.

(10) Patent No.: US 9,543,058 B2
(45) Date of Patent: Jan. 10, 2017

(54) INSULATED WINDING WIRE

(71) Applicant: Essex Group, Inc., Atlanta, GA (US)

(72) Inventors: Allan R. Knerr, Fort Wayne, IN (US); Gregory S. Caudill, Fort Wayne, IN (US); Baber Inayat, Fort Wayne, IN (US); Jason Dennis Stephens, Fort Wayne, IN (US); Koji Nishibuchi, Fort Wayne, IN (US); Bogdan Gronowski, Fort Wayne, IN (US); Joonhee Lee, Gunpo-si (KR); Won S. Lee, Gunpo-si (KR)

(73) Assignee: Essex Group, Inc., Fort Wayne, IN (US)

( * ) Notice: Subject to any disclaimer, the term of this patent is extended or adjusted under 35 U.S.C. 154(b) by 0 days.

(21) Appl. No.: 14/630,689

(22) Filed: Feb. 25, 2015

(65) Prior Publication Data

US 2015/0243410 A1 Aug. 27, 2015

Related U.S. Application Data

(60) Provisional application No. 61/944,390, filed on Feb. 25, 2014.

(51) Int. Cl.

| | |
|---|---|
| *H01B 7/00* | (2006.01) |
| *H01B 7/02* | (2006.01) |
| *H02K 3/32* | (2006.01) |
| *H02K 3/04* | (2006.01) |
| *H01F 1/00* | (2006.01) |
| *H02K 3/30* | (2006.01) |

(Continued)

(52) U.S. Cl.
CPC .............. *H01B 7/0275* (2013.01); *H01B 3/18* (2013.01); *H01B 7/0216* (2013.01); *H01B 13/14* (2013.01); *H01F 1/00* (2013.01); *H02K 3/04* (2013.01); *H02K 3/30* (2013.01); *H02K 3/32* (2013.01)

(58) Field of Classification Search
CPC .... H01F 5/00; H01F 27/00–27/30; H01B 7/00
USPC .............. 336/65.206–65.208, 210; 174/120 C
See application file for complete search history.

(56) References Cited

U.S. PATENT DOCUMENTS

| | | |
|---|---|---|
| 3,277,365 A | 10/1966 | Doran |
| 3,573,210 A | 3/1971 | Furusawa et al. |

(Continued)

FOREIGN PATENT DOCUMENTS

WO        WO9831022        7/1998

OTHER PUBLICATIONS

International Search Report for PCT/US2015/014452. filed on Feb. 4, 2015.

(Continued)

*Primary Examiner* — Tuyen Nguyen

(57) ABSTRACT

An insulated winding wire may include a conductor and insulation formed around the conductor. The insulation may include a base insulation layer formed around the conductor and having a first dielectric constant ($\epsilon 1$). The insulation may further include an extruded thermoplastic layer formed around the base insulation layer and having a second dielectric constant ($\epsilon 2$). The extruded thermoplastic layer may include (i) at least one polymer comprising a ketone group and (ii) at least one fluoropolymer. A ratio of the dielectric constant ($\epsilon 2$) of the extruded thermoplastic layer to the dielectric constant ($\epsilon 1$) of the base layer at 250° C. may be less than or equal to approximately 1.0.

40 Claims, 7 Drawing Sheets

(51) Int. Cl.
*H01B 13/14* (2006.01)
*H01B 3/18* (2006.01)

(56) References Cited

U.S. PATENT DOCUMENTS

| | | | |
|---|---|---|---|
| 3,645,929 A * | 2/1972 | Normanton | C08J 9/0061 |
| | | | 264/54 |
| 3,692,924 A | 9/1972 | Nye | |
| 4,284,841 A | 8/1981 | Tijunelis et al. | |
| 4,391,848 A | 7/1983 | Hilker | |
| 4,394,417 A | 7/1983 | Hilker | |
| 4,489,130 A | 12/1984 | Hilker | |
| 4,833,354 A | 5/1989 | Miller | |
| 5,115,103 A * | 5/1992 | Yamanishi | C08J 9/32 |
| | | | 174/101.5 |
| 5,151,147 A | 9/1992 | Foster et al. | |
| 5,208,426 A | 5/1993 | Kennedy et al. | |
| 5,319,269 A | 6/1994 | Bryant | |
| 5,731,088 A | 3/1998 | La Court | |
| 6,177,518 B1 | 1/2001 | Lahijani | |
| 6,319,604 B1 | 11/2001 | Xu | |
| 6,388,195 B1 | 5/2002 | Studer | |
| 6,534,714 B2 | 3/2003 | Daume | |
| 8,586,869 B2 | 11/2013 | Aoi | |
| 9,224,523 B2 | 12/2015 | Mutch | |
| 2006/0065429 A1 | 3/2006 | Kim et al. | |
| 2006/0137895 A1* | 6/2006 | Varkey | H01B 7/0291 |
| | | | 174/113 R |
| 2008/0128154 A1 | 6/2008 | Faust et al. | |
| 2008/0296042 A1 | 12/2008 | Heffner | |
| 2010/0032184 A1 | 2/2010 | Honda et al. | |
| 2010/0304180 A1 | 12/2010 | Amey et al. | |
| 2011/0036613 A1 | 2/2011 | Hayashishita et al. | |
| 2011/0226508 A1 | 9/2011 | Aoi et al. | |
| 2012/0285724 A1* | 11/2012 | Oya | H01B 3/306 |
| | | | 174/120 C |
| 2013/0032377 A1 | 2/2013 | Morishita | |
| 2013/0037304 A1 | 2/2013 | Ikeda et al. | |
| 2013/0062097 A1 | 3/2013 | Hammond et al. | |
| 2013/0255992 A1 | 10/2013 | Yamazaki | |
| 2013/0278117 A1 | 10/2013 | Parmeter | |
| 2014/0329087 A1 | 11/2014 | Masuda et al. | |
| 2015/0027748 A1 | 1/2015 | Fukuda | |

OTHER PUBLICATIONS

International Search Report for PCT/US2015/017326, filed on Feb. 24, 2015.

* cited by examiner

INSULATED WINDING WIRE

CROSS-REFERENCE TO RELATED APPLICATION

This application claims priority to U.S. Provisional Application No. 61/944,390, filed Feb. 25, 2014 and entitled "Insulated Winding Wire," the contents of which is incorporated by reference herein in its entirety.

TECHNICAL FIELD

Embodiments of the disclosure relate generally to insulated winding wire and, more particularly, to winding wire formed with an insulation system having an extruded layer containing a combination of (i) a polymer containing a ketone group and (ii) a fluoropolymer.

BACKGROUND

Magnetic winding wire, also referred to as magnet wire, is used in a multitude of electrical devices that require the development of electrical and/or magnetic fields to perform electromechanical work. Examples of such devices include electric motors, generators, transformers, actuator coils, and so on. Typically, magnet wire is constructed by applying electrical insulation to a metallic conductor, such as a copper, aluminum, or alloy conductor. The conductor typically is drawn or formed to have a rectangular or round cross-section. The electrical insulation is typically formed as a coating that provides for electrical integrity and prevents shorts in the magnet wire. Conventional insulations include polymeric enamel films, polymeric tapes, paper insulation, and certain combinations thereof.

In certain applications, it is desirable to have magnet wire that includes relatively higher electrical properties, such as a higher dielectric strength and/or a higher partial discharge inception voltage ("PDIV"). The dielectric strength of a material generally refers to the maximum applied electric field that the material can withstand without breaking down. The PDIV generally refers to a voltage at which localized insulation breakdowns can occur. Partial discharge typically begins within voids, cracks, or inclusions within a solid dielectric; however, it can also occur along surfaces of an insulation material. Once begun, partial discharge progressively deteriorates an insulation material and ultimately leads to electrical breakdown.

Additionally, in certain applications, it is desirable to limit or minimize insulation thickness in order to permit a higher amount of magnet wire to be packed or formed into an electrical device coil. For example, with many devices intended to be utilized in vehicles, it is desirable to reduce the size of magnet wire in order to more tightly pack wire into an available housing. The performance of an electrical device is strongly correlated to an amount of magnet wire that can be placed into an available core slot area. Accordingly, reducing the thickness of magnet wire insulation may permit higher power output and/or increased performance.

For certain applications, such as vehicle applications, it may also be desirable for magnet wire to be resistant to hydrocarbon oil and/or moisture. For example, in some motor applications, magnet wire is at least partially submerged in transmission fluid. This transmission fluid can break down traditional magnet wire insulation materials, such as enamel insulations.

As set forth above, traditional magnet wire is formed with polymeric enamel insulation that is applied in successive layers and baked in a furnace. In order to achieve higher dielectric and partial discharge performance, it is typically necessary to apply a greater number of layers and, therefore, thicken the enamel. However, each successive pass through the baking furnace lowers the adhesive force between the enamel and the conductor, and it is difficult to build the thickness of the enamel beyond a certain point. Additionally, increased enamel layering may lead to solvent blisters or beading and/or reduced flexibility.

Recent attempts have been made to form magnet wire with extruded thermoplastic insulation, such as extruded polyphenylene sulfide or extruded polyether ether ketone. However, even in light of these recent attempts, there is an opportunity for improved insulated magnet wire and associated magnet wire insulation. For example, there is an opportunity for improved insulated magnet wire having increased PDIV values and/or dielectric strengths.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
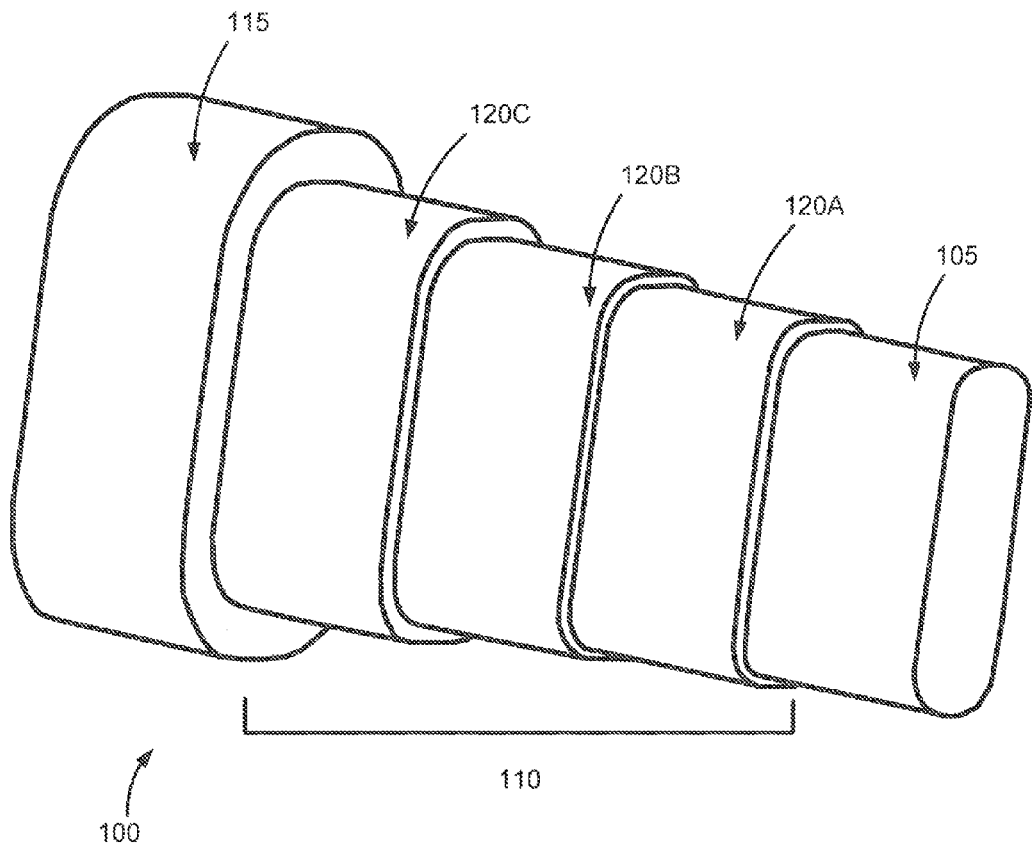
FIG. 1 is a perspective view of an example magnet wire that includes a base polymeric insulation material and an outer layer of an extruded resin, according to an illustrative embodiment of the disclosure.

Various embodiments of the present disclosure are directed to insulated winding wires, magnetic winding wires, and/or magnet wires (hereinafter referred to as "magnet wire") having an insulation system that includes an extruded material formed as a combination of a polymer containing a ketone group and a fluoropolymer. For example, an extruded material may contain at least one of polyether-ether-ketone ("PEEK") or polyaryletherketone ("PAEK") in combination with a suitable fluropolymer. In certain embodiments, one or more base layers of insulation may be formed or applied on and/or around a conductor, and the extruded material may be formed around the one or more base layers. Suitable base layers may include, for example, one or more enamel layers, one or more polymeric tapes or wraps, one or more semi-conductive layers, and/or one or more other extruded layers. In other embodiments, the extruded material may be formed or applied directly on a bare conductor. Additionally, in certain embodiments, the extruded material may be formed as an outermost layer. In other embodiments, any number of other layers may be formed over the extruded material.

In certain embodiments, a magnet wire with an extruded insulation material containing a ketone group and a fluoropolymer may be capable of withstanding relatively high voltages. For example, magnet wire in accordance with embodiments of the disclosure may have an insulation system with a dielectric strength greater than or equal to 7,500 volts and, in certain cases, a dielectric strength greater than or equal to 10,000 volts. In certain embodiments, the magnet wire may have an insulation system with a partial discharge inception voltage greater than or equal to 1,000 volts, 1,250 volts, 1,400 volts, or some other suitable value. Additionally, the magnet wire and insulation system may be capable of a continuous operating temperature of at least 220° C. without degradation. In other words, the magnet wire may have a thermal classification of at least 220° C. in accordance with the American Society for Testing and Materials ("ASTM") standard 2307. The magnet wire may also be resistant to various oils, liquids, and/or chemicals, such as transmission fluid. Additionally, the magnet wire may be capable of withstanding significant mechanical forces during a coil formation process. Further, in certain embodiments, the insulation system may have a thickness that is small enough to permit relatively tight packing of the magnet wire when formed into a coil. For example, the insulation system may have a total thickness of less than approximately 0.0240 inches (610 µm), such as a total thickness between approximately 0.0033 inches (85 µm) and approximately 0.0094 inches (240 µm).

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a perspective view of an example magnet wire 100 is illustrated in accordance with an embodiment of the disclosure. The magnet wire 100 may include a central conductor 105, a base layer of polymeric insulation 110 formed around the central conductor 105, and an extruded top coat 115 formed as an outer layer. As desired, the base layer 110 may include any number of sublayers, such as the three sublayers 120A-C illustrated in FIG. 1. Each of the layers or components of the magnet wire will now be described in greater detail.

Turning first to the conductor 105, the conductor 105 may be formed from a wide variety of suitable materials and or combinations of materials. For example, the conductor 105 may be formed from copper (e.g., annealed copper, oxygen-free copper, etc.), aluminum, copper-cladded aluminum, silver-plated copper, silver, gold, a conductive alloy, or any other suitable electrically conductive material. Additionally, the conductor 105 may be formed with any suitable dimensions and/or cross-sectional shapes. As shown, the conductor 105 may have an approximately rectangular cross-sectional shape. However, as explained in greater detail below with reference to FIGS. 3A-3F, the conductor 105 may be formed with a wide variety of other cross-sectional shapes, such as a rectangular shape (i.e., a rectangle with sharp rather than rounded corners), a square shape, an approximately square shape, a circular shape, an elliptical or oval shape, a hexagonal shape, a polygonal shape, etc. Additionally, as desired, the conductor 105 may have corners that are rounded, sharp, smoothed, curved, angled, truncated, or otherwise formed.

In addition, the conductor 105 may be formed with any suitable dimensions. For the illustrated rectangular conductor 105, the longer sides may be between approximately 0.020 inches (5081 µm) and approximately 0.750 inches (19050 µm), and the shorter sides may be between approximately 0.020 inches (508 µm) and approximately 0.400 inches (10160 µm). An example square conductor may have sides between approximately 0.020 inches (508 µm) and approximately 0.500 inches (12700 µm). An example round conductor may have a diameter between approximately 0.010 inches (2541 µm) and approximately 0.500 inches (12700 µm). Other suitable dimensions may be utilized as desired, and the described dimensions are provided by way of example only.

A wide variety of suitable methods and/or techniques may be utilized to form, produce, or otherwise provide a conductor 105. For example, a conductor 105 may be formed by drawing an input material (e.g., a larger conductor, etc.) with one or more dies in order to reduce the size of the input material to desired dimensions. As desired, one or more flatteners and/or rollers may be used to modify the cross-sectional shape of the input material before and/or after drawing the input material through any of the dies. In certain embodiments, the conductor 105 may be formed in tandem with the application of a portion or all of the insulation system. In other words, conductor formation and application of insulation material may be conducted in tandem. In other embodiments, a conductor 105 with desired dimensions may be preformed or obtained from an external source. Insulation material may then be applied or otherwise formed on the conductor 105.

The base layer of insulation 110 (hereinafter referred to as the base layer 110), which may be optional in certain embodiments, may include one or more suitable types of polymeric insulation. The base layer 110 may be formed as a first layer of insulation, and one or more additional layers of insulation, such as the extruded top coat 115 and one or more optional intermediary layers, may be formed over the base layer 110. In certain embodiments, the base layer 110 may be formed directly on the conductor 105, for example, around an outer periphery of the conductor 105. Additionally, as desired, the base layer 110 may include a single layer of insulation material or a plurality of sublayers of insulation material, such as sublayers 120A-C.

In the event that the base layer 110 is formed from a plurality of sublayers, any number of sublayers may be utilized. In certain embodiments, the sublayers may be formed from the same substance or material. For example, the sublayers may be formed as a plurality of enamel layers, and each enamel layer may be formed from the same polymeric material. In other embodiments, at least two of the sublayers may be formed from different materials. For example, different enamel layers may be formed from different polymeric materials. As another example, one or more sublayers may be formed from enamel while another sublayer is formed from a suitable tape or wrap.

Figure 2A:
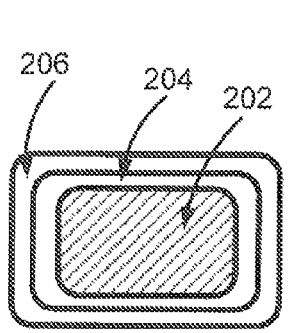
FIG. 2A is a cross-sectional view of an example magnet wire that includes an enameled base layer and an outer layer of an extruded resin, according to an illustrative embodiment of the disclosure.

In certain embodiments, the base layer 110 may include one or more layers of enamel. FIG. 2A illustrates an example magnet wire 200 in which enamel 204 is used as a base layer formed on a conductor 202, and then an extruded layer 206 is formed over the enamel 204. An enamel layer is typically formed by applying a polymeric varnish to the conductor 105 and then baking the conductor 105 in a suitable enameling oven or furnace. A wide variety of techniques may be utilized to apply the varnish. For example, the conductor 105 may be passed through a die that applies the varnish. As another example, the varnish may be dripped or poured onto the conductor. Typically, the polymeric varnish includes between approximately 12% and approximately 30% solid material (although other percentages can be used) mixed with one or more solvents. Once the polymeric varnish is applied, the solvents are typically evaporated by an enameling oven.

As desired, multiple layers of enamel may be applied to the conductor 105. For example, a first layer of enamel may be applied, and the conductor 105 may be passed through an enameling oven. A second layer of enamel may then be applied, and the conductor 105 may make another pass through the enameling oven (or a separate oven). This process may be repeated until a desired number of enamel coats have been applied and/or until a desired enamel thickness or build has been achieved.

A wide variety of different types of polymeric materials may be utilized as desired to form an enamel layer. Examples of suitable materials include, but are not limited to, polyimide, polyamideimide, amideimide, polyester, polyesterimide, polysulfone, polyphenylenesulfone, polysulfide, polyphenylenesulfide, polyetherimide, polyamide, etc. In certain embodiments, a polyimide-based material (e.g., polyimide, polyamideimide, etc.) may be utilized, as these materials typically have relatively high heat resistance. Additionally, in certain embodiments, an enamel layer may be formed as a mixture of two or more materials. Further, in certain embodiments, different enamel layers may be formed from the same material(s) or from different materials. In one example embodiment, at least one layer of polyamideimide ("PAI") enamel and at least one layer of polyimide ("PI") enamel may be formed. In another example embodiment, a layer of PI enamel may be formed between two layers of PAI enamel, thereby resulting in a PAI/PI/PAI enamel construction. A wide variety of other enamel constructions may be utilized as desired.

One or more layers of enamel may be formed to have any desired overall thickness or enamel build. In certain embodiments, the enamel formed on the conductor 105 may have a thickness between approximately 0.001 inches (251 µm) and approximately 0.01 inches (254 µm). For example, the enamel may have a thickness between approximately 0.003 inches (76 µm) and 0.005 inches (127 µm). In other embodiments, the enamel may have a thickness of approximately 0.0004 inches (10 µm) 0.001 inches (25 µm), approximately 0.002 inches (51 µm), approximately 0.003 inches (76 µm), approximately 0.004 inches (102 µm), approximately 0.005 inches (127 µm), approximately 0.006 inches (152 µm), approximately 0.007 inches (178 µm), approximately 0.008 inches (203 µm), approximately 0.009 inches (229 µm), approximately 0.01 inches (254 µm), any value included in or incorporated into a range between any two of the aforementioned example thicknesses, or any value that is equal to or less than any one of the aforementioned thicknesses (e.g., a thickness of less than approximately 0.005 inches, etc.). Indeed, a wide variety of enamel thicknesses may be utilized as desired.

Figure 2B:
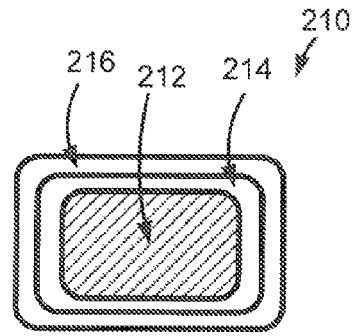
FIG. 2B is a cross-sectional view of an example magnet wire that includes a base layer of a polymeric wrap and an outer layer of an extruded resin, according to an illustrative embodiment of the disclosure.

In certain embodiments, the base layer 110 may be formed from a suitable wrap or tape, such as a polymeric tape. FIG. 2B illustrates an example magnet wire 210 in which a tape 214 is wrapped around a conductor 212 as a base layer, and then an extruded layer 216 is formed over the tape 214. A wide variety of suitable polymeric tapes or wraps may be utilized as desired to form a base layer 110. For example, a polyimide tape may be utilized, such as a Kapton® tape as manufactured and sold by the E.I. du Pont de Nemours and Company. In certain embodiments, additional materials or additives may be incorporated into, embedded into, or adhered to a polyimide tape. For example, a polyimide tape may include a fluorinated material, such as a fluorinated ethylene propylene (FEP) polymer layer (or FEP material), formed on one or both sides of the tape. In one example embodiment, a polyimide tape may have FEP formed (e.g., coated on, adhered to, etc.) on both sides of the tape. In another embodiment, the polyimide tape may include a silicon adhesive, such as Polyimide Film Tape 5413 as manufactured and sold by 3M™ Corporation.

As desired, a tape may include a wide variety of suitable dimensions, such as any suitable thickness and/or width. For example, a polyimide tape may have a thickness between approximately 0.00035 inches (8.9 µm) and approximately 0.005 inches (127 µm). Additionally, a tape may have any desirable width, such as a width between approximately 0.180 inches (4572 µm) and approximately 1.000 inches (25400 µm). In certain embodiments, a tape may have a width of approximately 0.1875 inches (4.8 mm), 0.250 inches (6.35), 0.375 inches (9.5 mm), 0.500 inches (12.7 mm), 0.625 inches (15.8 mm) or 0.750 inches (19 mm).

In certain embodiments, the tape may be wrapped around the conductor 105 at an angle along a longitudinal direction or length of the conductor. In other words, an angle may be formed between a dimension of the tape (e.g., a width dimension) and a longitudinal or length dimension of the conductor 105. The tape may be wrapped at any suitable angle as desired, such as an angle between approximately 30 degrees and approximately 70 degrees. In certain embodiments, the tape may overlap itself as it is wrapped around the conductor 105. For example, a first wrap may be formed around the conductor 105, and a second wrap may formed such that it overlaps the first wrap along a shared edge. A third wrap may then be formed over the second wrap and so on. In certain embodiments, the tape may be formed to have overlap between approximately 40% and approximately 80% of the width of the tape. In one example embodiment, a tape may have an overlap between approximately 45% and approximately 50%. In another example embodiment, a tape may have an overlap between approximately 60% and approximately 65%. Any other suitable overlaps may be utilized as desired. Indeed, in certain embodiments, a tape may be wrapped such that double and/or triple layers of tape insulation are formed. Alternatively, in certain embodiments, a plurality of tapes may be wrapped around a conductor 105. For example, multiple tapes may be wrapped in the same direction or, alternatively, at least two tapes may be wrapped in opposite directions (e.g., clockwise and counterclockwise). Indeed, tapes may be wrapped at any angle and/or combinations of angles.

Figure 2C:
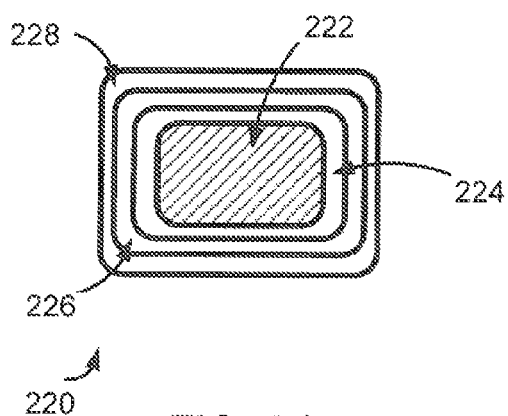
FIG. 2C is a cross-sectional view of an example magnet wire that includes an enameled layer, a polymeric wrap layer, and an outer layer of an extruded resin, according to an illustrative embodiment of the disclosure.

In yet other embodiments, both enamel and a tape wrap may be formed around a conductor 105. FIG. 2C illustrates an example magnet wire 220 in which enamel 224 is formed on a conductor 222, and then a tape 226 is wrapped around the conductor 222 and enamel 224. An extruded layer 228 is then formed over the tape 226. The enamel layer(s) and the tape layers may include similar materials and/or may be formed utilizing similar processes as those discussed above. Additionally, in certain embodiments, the combination of enamel and tape may be considered as jointly forming the base layer 110. In other embodiments, one material may be considered a base layer 110 while the other material is considered an intermediary layer between the base layer 110 and the extruded top coat 115.

Figure 2D:
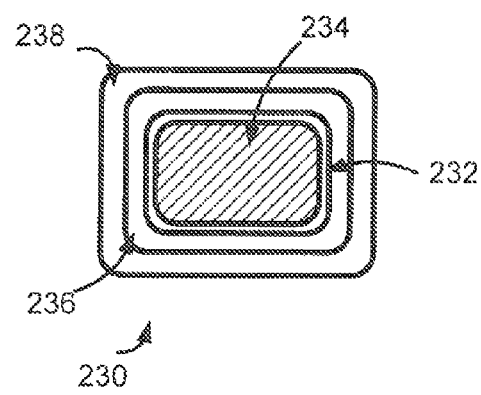
FIG. 2D is a cross-sectional view of an example magnet wire that includes a semi-conductive layer, an enameled layer, and an outer layer of an extruded resin, according to an illustrative embodiment of the disclosure.

In certain embodiments, one or more semi-conductive layers may be incorporated into the magnet wire 100. For example, one or more semi-conductive layers may be formed on the conductor 105, and the base layer 110 may be formed on top of the semi-conductive layer. Alternatively, an extruded layer 115 may be formed directly on top of the semi-conductive layer without the presence of a base layer. As another example, one or more semi-conductive layers may be incorporated into the base layer 110. As yet another example, one or more semi-conductive layers may be formed on top of the extruded layer 115 or as a top coat. As yet another example, semi-conductive material may be incorporated into the extruded layer 115. FIG. 2D illustrates an example magnet wire 230 in which a semi-conductive layer 232 is formed around a conductor 234. A base layer 236 and an extruded layer 238 are then formed on the semi-conductive layer 232.

A semi-conductive layer may be formed from a wide variety of suitable materials and/or combinations of materials. In certain embodiments, a semi-conductive layer may be formed from a material that combines one or more suitable filler materials with one or more base materials. For example, semi-conductive and/or conductive filler material may be combined with one or more suitable base materials. Examples of suitable filler materials include, but are not limited to, suitable inorganic materials such as metallic materials and/or metal oxides (e.g., zinc, copper, aluminum, nickel, tin oxide, chromium, potassium titanate, etc.), and/or carbon black; suitable organic materials such as polyaniline, polyacetylene, polyphenylene, polypyrrole, other electrically conductive particles; and/or any suitable combination of materials. The particles of the filler material may have any suitable dimensions, such as any suitable diameters. In certain embodiments, the filler material may include nanoparticles. Examples of suitable base materials may include, but are not limited to, polyimide, polyamideimide, amideimide, polyester, polyesterimide, polysulfone, polyphenylenesulfone, polysulfide, polyphenylenesulfide, polyetherimide, polyamide, or any other suitably stable high temperature thermoplastic or other material. Further, any suitable blend or mixture ratio between filler material and base material may be utilized. For example, the semi-conductive layer may include between approximately 3 percent and approximately 20 percent filler material(s) by weight, although other concentrations may be used (e.g., between approximately 5 percent and approximately 50 percent, between approximately 7 percent and approximately 40 percent, etc.).

In certain embodiments, the semi-conductive/conductive properties of a suitable material implemented in the construction of a semi-conductive layer may be characterized by either the volume resistivity or volume conductivity or by the surface resistivity or surface conductivity. Typically, the values of surface resistivity of a semi-conductive layer range from approximately $10^{-1}$ Ω/square to approximately $10^6$ Ω/square. Most often however, these values will be selected from the range between approximately $10^1$ Ω/square and approximately $10^5$ Ω/square. Typically, the values of volume resistivity of a semi-conductive/conductive layer range between approximately $10^{-2}$ Ω/cm to approximately $10^6$ Ω/cm. Most often however, the accepted values will be in the range between approximately $10^{-1}$ Ω/cm and approximately $10^5$ Ω/cm. In the event that a plurality of semi-conductive layers are utilized in a stacked arrangement, each adjacent set of semi-conductive layers may have approximately equal or decreasing conductivities. For example, a plurality of semi-conductive layers having decreasing conductivities may be formed on the conductor 105.

Additionally, a semi-conductive layer may have any suitable thickness. For example, one or more semi-conductive layers may have thicknesses similar to those discussed above for enamel layers. In certain embodiments, one or more semi-conductive layers may be formed in a similar manner as an enamel layer. For example, a varnish including semi-conductive material may be applied, and the varnish may be heated by one or more suitable heating devices, such as an enameling oven. In other embodiments, one or more semi-conductive layers may be extruded. In yet other embodiments, a semi-conductive layer may be formed as a suitable semi-conductive tape layer in which semi-conductive and/or conductive materials are applied to or embedded in a suitable substrate.

In the event that one or more semi-conductive layers are applied directly on or around the conductor 105, the semi-conductive layer(s) may equalize or "smooth" non-uniform electric fields within the magnet wire 100. Imperfections on the surface of the conductor 105, such as burs, dents, slivers of conductive material, foreign contaminants, etc., may lead to non-uniform electric fields. The semi-conductive layer(s) formed on or around the conductor 105 may improve or mitigate the uniformity of the electric fields when the conductor 105 is electrified. As a result, the semi-conductive layer(s) may function as a buffer for the insulating structure of the magnet wire 100. The buffering and/or smoothing effects may be relatively higher for the innermost insulating material and/or insulating layers, which typically are more stressed by electric fields. Similarly, if one or more semi-conductive layers are formed as the outermost layers of a magnet wire 100 (i.e., on top of the extruded layer 115, etc.), the semi-conductive layer(s) may assist in equalizing electric fields that impact the magnet wire.

As a result of incorporating a semi-conductive/conductive layer into a magnet wire, it may be possible to increase the partial discharge inception voltage ("PDIV") and/or dielectric strength of the magnet wire. A semi-conductive/conductive layer may assist in equalizing voltage stresses in the insulation and/or equalizing or "smoothing" non-uniform electric fields at or near the conductor and/or at or near a surface of the magnet wire.

Figure 2E:
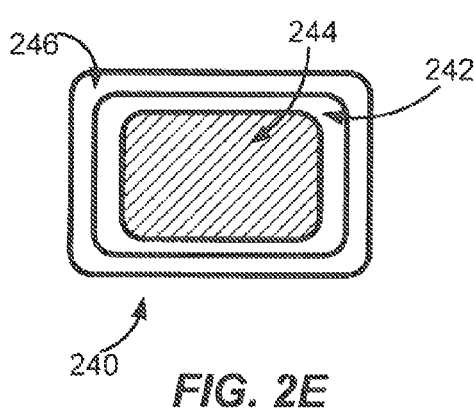
FIG. 2E is a cross-sectional view of an example magnet wire that includes a semi-conductive layer and an outer layer of an extruded resin, according to an illustrative embodiment of the disclosure.
Figure 2F:
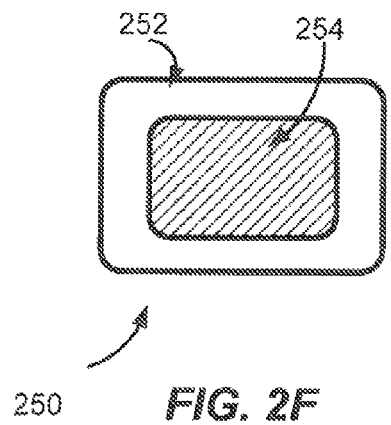
FIG. 2F is a cross-sectional view of an example magnet wire that includes an extruded resin insulation, according to an illustrative embodiment of the disclosure.

Although FIG. 2D illustrates a semi-conductive layer 232 being applied beneath both a base layer 236 and an extruded layer 238, in other embodiments, an extruded layer may be formed directly on the semi-conductive layer. FIG. 2E illustrates an example magnet wire 240 in which a semi-conductive layer 242 is formed on a conductor 244, and an extruded layer 246 is then formed around the semi-conductive layer 242. In other words, the magnet wire 240 of FIG. 2E does not include any base layer(s) of insulation. FIG. 2F illustrates another example magnet wire 250 that does not include any base layer(s) of insulation. In the magnet wire 250 of FIG. 2F, an extruded layer 252 (or combination of extruded layers) is formed directly on a conductor 254, for example, directly on a bare conductor. Indeed, it will be appreciated that a wide variety of suitable magnet wire constructions may be formed in accordance with various embodiments of the disclosure. The constructions illustrated in FIGS. 1 and 2A-2F are provided by way of example only.

With continued reference to FIG. 1, an extruded layer 115 or an extruded top coat may be formed around the base layer 110 (and/or any semi-conductive layers and/or intermediary layers of insulation). Alternatively, in embodiments that do not include any base layer(s), an extruded layer 115 may be formed directly on the conductor 105. In certain embodiments, the extruded layer 115 may be formed from a suitable thermoplastic resin that is extruded over the conductor and/or any other applicable layers. As desired in certain embodiments, the extruded layer 115 may be formed as a single layer. In other embodiments, the extruded layer 115 may include a plurality of extruded layers or sublayers.

According to an aspect of the disclosure, the extruded layer 115 (or at least one sublayer of the extruded layer 115) may be formed from a material that combines a polymer having a ketone group and a fluoropolymer ("FP"). For example, a fluoropolymer may be mixed, blended, infused into, bonded, or otherwise combined with a material having at least one ketone group. Examples of suitable polymers that include a ketone group include, but are not limited to, polyether-ether-ketone ("PEEK"), polyaryletherketone ("PAEK"), polyetheretherketoneketone ("PEEKK"), polyetherketoneketone ("PEKK"), polyetherketone ("PEK"), polyetherketoneketoneetherketone ("PEKKEK"), and/or other suitable materials.

Examples of suitable fluoropolymers include, but are not limited to polytetrafluoroethylene ("PTFE"), polyvinylfluoride ("PVF"), polyvinylidene fluoride ("PVDF"), polychlorotrifluoroethylene ("PCTFE"), a perfluoroalkoxy polymer, a perfluoroalkoxy alkane ("PFA") copolymer, fluorinated ethylene propylene ("FEP"), polyethylenetetrafluorocthylene ("ETFE"), polyethylenechlorotrifluoroethylene ("ECTFE"), a perfluorinated elastomer, perfluoropolyether ("PFPE"), and/or other suitable materials. In one example embodiment, PTFE may be utilized. In certain embodiments, a fluoropolymer with a relatively higher melting point, such as a melting point above 300° C., may be utilized. Additionally, any suitable mixture or blend ratio may be utilized as desired to form a material having both a ketone group and a fluoropolymer. For example, a fluoropolymer may be mixed or blended with a material having a ketone group such that the fluoropolymer constitutes between approximately five percent (5.0%) and approximately seventy-five percent (75.0%) by weight of the resulting material. In certain embodiments, a fluoropolymer or combination of fluoropolymers may constitute approximately 5.0%, 10.0%, 15.0%, 20.0%, 25.0%, 30.0%, 35.0%, 40.0%, 45.0%, 50.0%, 55.0%, 60.0%, 65.0%, 70.0%, 75.0% or any suitable value incorporated in a range bounded by any two of the aforementioned values.

Examples of suitable materials that may be utilized for the extruded layer 115 include various PEEK-FP and/or PAEK-FP materials as manufactured by Solvay Specialty Polymers. These materials include, but are not limited to, KetaSpire-type and/or AvaSpire-type materials in which the PEEK and/or PAEK are compatible with fluoropolymer, as well as any other suitable materials that combine a polymer with a ketone group and a fluoropolymer. In certain embodiments, a lubricant and/or other additives may also be added to the materials. For example, pellets of a particular material may be "dusted" with a lubricant to facilitate or enhance extrusion of the material.

In certain embodiments, an extrudable ketone/fluoropolymer material may have a tensile modulus or Young's modulus of at least approximately 2.0 GPa (approximately 300,000 psi). For example, a material may have a tensile modulus of at least approximately 2.5 GPa. Additionally, an extrudable material may have a relatively low dielectric constant. Indeed, the addition of a fluoropolymer to a material having a ketone group (e.g., PEEK, PAEK, etc.) may enhance the dielectric properties of the resulting material. In certain embodiments, the extrudable material may have a dielectric constant below approximately 3.5, approximately 3.2, approximately 3.1, approximately 3.0, or any other suitable value at 25° C. and one Kilohertz (1 kHz). For example, the extrudable material may have a dielectric constant below approximately 2.95 at 25° C. As desired, the extrudable material may also be resistant to various chemicals, have a relatively high thermal rating, and/or be resistant to corona discharges.

When a multilayer insulation system is formed on a magnet wire 100, each of the various layers (e.g., enamel layers, extruded layers, etc.) may have any suitable dielectric constant values. The overall insulation system may also have any suitable dielectric constant. In certain embodiments, the insulation system formed on a magnet wire may have a dielectric constant below approximately 3.5, below approximately 3.3, below approximately 2.8, or below approximately 2.6 at 25° C. and 1 kHz. In other embodiments, an overall insulation system may have a dielectric constant below approximately 4.5 at 250° C. and 1 kHz. For example, an insulation system may have a dielectric constant between approximately 3.5 and approximately 4.5 or a dielectric constant between approximately 3.5 and 4.0 at 250° C. and 1 kHz. In other embodiments, an overall insulation system may have a dielectric constant below approximately 3.5 at 250° C. and 1 kHz.

Additionally, a wide variety of ratios may exist between the dielectric constants for various layers. A few non-limiting examples of dielectric constants, ranges of dielectric constants, and/or ratios of dielectric constants for an insulation system that includes both one or more enamel layers and one or more extruded layers is listed in Table 1 below; however, it will be appreciated that other magnet wire constructions may include other dielectric constants.

TABLE 1

Dielectric Constants of an Enamel/Extruded Insulation System

| Measured Parameter | Enamel Layer(s) | Extruded Layer(s) | Ratio of Extruded to Enamel |
|---|---|---|---|
| 1 KHz Dielectric Constant at 25° C. | 3.6-4.6 | 3.0-3.5 | 0.65-0.97 |
| 1 KHz Dielectric Constant at 250° C. | 3.8-4.96 | 3.0-4.3 | 0.6-1.13 |

With reference to Table 1, the enamel layer(s) may include one or more layers formed from a wide variety of suitable enamels, such as PAI and/or PI. For example, a combination of PI and PAI may be utilized to form base enamel insulation. In certain embodiments, a dielectric constant of the extruded layer(s) may be less than or equal to a dielectric constant of one or more underlying base insulation layers. For example, a base layer of insulation may have a first dielectric constant ($\epsilon 1$), and an extruded layer that includes a polymer having a ketone group and a fluoropolymer may have a second dielectric constant ($\epsilon 2$). As another example, a combination of base layers of insulation may have a first dielectric constant ($\epsilon 1$), and an extruded layer may have a second dielectric constant ($\epsilon 2$). In accordance with an aspect of the disclosure, a ratio of the second dielectric constant ($\epsilon 2$) to the first dielectric constant ($\epsilon 1$) may be less than or equal to approximately 1.0 at 250° C. For example, a ratio ($\epsilon 2/\epsilon 1$) of the dielectric constants may be less than 1.0 at 250° C. As another example, a ratio ($\epsilon 2/\epsilon 1$) of the dielectric constants may be between approximately 0.6 and approximately 1.0 at 250° C.

In multi-layer insulation systems, use of a fluorinated extruded layer (e.g., PEEK-FP, PAEK-FP, etc.) may also result in a lower overall dielectric constant for an insulation system relative to convention insulation systems. For example, a PEEK-FP material may have a lower dielectric constant than PEEK. Thus, an insulation system that utilizes PEEK-FP in conjunction with base insulation may have a lower dielectric constant than an insulation system that utilizes PEEK in conjunction with a similar base insulation.

An extrusion process may result in the formation of an insulation layer from approximately 100% solid material. In other words, the extruded layer 115 may be substantially free of any solvents. As a result, the application of the extruded layer 115 may be less energy intensive than the application of an enamel layer as there is no need to evaporate solvents. In certain embodiments, the extruded layer 115 may be formed as a single layer. In other words, a single polymeric extrusion step may be performed during formation of the extruded layer 115. In other embodiments, the extruded layer 115 may be formed via a plurality of extrusion steps. In other words, the extruded layer 115 may be formed from a plurality of sublayers. If the extruded layer 115 includes sublayers, the sublayers may be formed from the same material or, alternatively, at least two layers may be formed from different materials. For example, an extruded layer 115 may include a plurality of sublayers that each contain a combination of a substance having a ketone group and a fluoropolymer. Various sublayers may be formed from the same material, from different materials (i.e., two different materials that each include a ketone group and a fluoropolymer, etc.), and/or from different materials including different blends and/or concentrations of ingredients.

As another example, a first extruded layer may include a material having both a ketone group and a fluoropolymer (e.g., PEEK-FP, PAEK-FP, etc.) material while a second extruded layer includes another suitable extrudable thermoplastic. As desired in various embodiments, the second extruded layer may be extruded over the first layer or under the first layer. In other embodiments, the first layer may be sandwiched between the second layer and a third layer. Indeed, any multi-layer construction may be formed in which at least one of the layers includes a material having a ketone group and a fluoropolymer.

Examples of other suitable materials that may be extruded in combination with a ketone group/fluoropolymer material include, but are not limited to, PEEK, PAEK, PEEKK, PEKK, PEK, PEKKEK, another suitable high temperature thermoplastic material, and/or any other suitable thermoplastic material. Indeed, a wide variety of different materials and/or combinations of materials may be utilized to form multi-layer extruded insulation.

The extruded layer 115 may be formed with any suitable thickness as desired in various embodiments. For example, the extruded layer may be formed with a thickness between approximately 0.001 inches (25 μm) and approximately 0.024 inches (610 μm). In certain embodiments, the extruded layer may have a thickness between approximately 0.003 inches (76 μm) and approximately 0.007 inches (178 μm). In other embodiments, the extruded layer may have a thickness of approximately 0.001 inches (25 μm), approximately 0.002 inches (51 μm), approximately 0.003 inches (76 μm), approximately 0.004 inches (102 μm), approximately 0.005 inches (127 μm), approximately 0.006 inches (152 μm), approximately 0.007 inches (178 μm), approximately 0.008 inches (203 μm), approximately 0.009 inches (229 μm), approximately 0.01 inches (254 μm), approximately 0.015 inches (381 μm), approximately 0.02 inches (508 μm), approximately 0.024 inches (610 μm), any value included in or incorporated into a range between any two of the aforementioned example thicknesses, or any value that is equal to or less than any one of the aforementioned thicknesses (e.g., a thickness of less than approximately 0.007 inches, etc.). These example thicknesses allow the extruded layer 115 to be thin enough to allow a relatively tight packing of the resulting magnet wire 100. Additionally, in certain embodiments, the extruded layer 115 may be formed to have a cross-sectional shape that is similar to that of the underlying conductor 105 and/or base layer 110. For example, if the conductor 105 has an approximately rectangular cross-sectional shape, the extruded layer 115 may be formed to have an approximately rectangular cross-sectional shape. In other embodiments, the extruded layer 115 may be formed with a cross-sectional shape that varies from that of the underlying conductor 105 (and/or the underlying base layer 110). As one non-limiting example, the conductor 105 may be formed with an elliptical cross-sectional shape while the extruded layer 115 is formed with an approximately rectangular cross-sectional shape. A wide variety of other suitable configurations will be appreciated.

Additionally, in certain embodiments, the extrusion process may be controlled such that the extruded layer 115 has a relatively uniform thickness along a longitudinal length of the magnet wire 100. In other words, the extruded layer 115 may be formed with a concentricity that is approximately close to 1.0. The concentricity of the extruded layer 115 is the ratio of the thickness of the extruded layer to the thinness of the extruded layer at any given cross-sectional along a longitudinal length of the magnet wire 100. In certain embodiments the extruded layer may be formed with a concentricity between approximately 1.1 and approximately 1.8. For example, the extruded layer may be formed with a concentricity between approximately 1.1 and approximately 1.5 or a concentricity between approximately 1.1 and 1.3. As other examples, the extruded layer may be formed with a concentricity that is less than approximately 1.5 or a concentricity that is less than approximately 1.3.

Similar to the extrusion layer 115, application of one or more other insulation layers (e.g., a base layer 110, an intermediary layer, a semi-conductive layer, etc.) may also be controlled to result in a desired concentricity. For example, any insulation layer may have a concentricity between approximately 1.1 and approximately 1.8, a concentricity between approximately 1.1 and approximately 1.5, a concentricity between approximately 1.1 and 1.3, a concentricity that is less than approximately 1.5, or a concentricity that is less than approximately 1.3. Additionally, the combined insulation layers may have a concentricity between approximately 1.1 and approximately 1.8, a concentricity between approximately 1.1 and approximately 1.5, a concentricity between approximately 1.1 and 1.3, a concentricity that is less than approximately 1.5, or a concentricity that is less than approximately 1.3.

In certain embodiments, the extruded layer 115 may be formed directly on the conductor 105. In other embodiments, the extruded layer 115 may be formed directly on an underlying base layer 110 (or an intermediary layer) or semi-conductive layer. In other words, the extruded layer 115 may be formed on an underlying layer without the use of a bonding agent, adhesion promoter, or adhesive layer. As explained in greater detail below, the temperature of the magnet wire 100 may be controlled prior to the application of the extruded layer 115 to eliminate the need for an adhesive layer. As a result, the extruded layer 115 may be bonded to an underlying layer without use of a separate adhesive.

The entire insulation system for the magnet wire 100 (e.g., a combination of the base layer 110 and extruded layer 115, etc.) may have any desired overall thickness. In certain embodiments, the overall insulation thickness may be less than approximately 0.0240 inches (610 µm). For example, the overall thickness may be between approximately 0.0033 inches (85 µm) and approximately 0.0094 inches (240 µm). In other example embodiments, the overall insulation system thickness may be less than approximately 0.024 inches (610 µm), 0.020 inches (508 µm), 0.015 inches (381 µm), 0.010 inches (254 µm), 0.009 inches (229 µm), 0.008 inches (203 µm), 0.007 inches (178 µm), 0.006 inches (152 µm), 0.005 inches (127 µm), 0.004 inches (102 µm), 0.0033 inches (85 µm), or any value included in or incorporated into a range between any two of the aforementioned example thickness values. With these example thickness, it may be possible to achieve a relatively high packing of the resulting magnet wire 100. As a result, a higher output rotary electrical device may be produced utilizing the magnet wire 100.

As a result of utilizing an insulation system that includes an extruded layer having a material with a ketone group and a fluoropolymer, a magnet wire 100 may be produced that has a relatively high dielectric strength and/or partial discharge inception voltage ("PDIV"). According to an aspect of the disclosure, the magnet wire 100 and its associated insulation system may have a dielectric strength greater than approximately 7,500 volts. In certain embodiments, the dielectric strength may be greater than approximately 10,000 volts. In certain embodiments, the dielectric strength may be greater than approximately 15,000 volts. Additionally, according to an aspect of the disclosure, the magnet wire 100 and its associated insulation system may have a PDIV greater than approximately 1,000 volts. In certain embodiments, the PDIV may be greater than approximately 1,200 volts, greater than approximately 1,250 volts, greater than approximately 1,300 volts, greater than approximately 1,400 volts, greater than approximately 1,500 volts, greater than approximately 1,600 volts, greater than approximately 1,800 volts, greater than approximately 2,000 volts, or any other suitable threshold value. In certain embodiments, the magnet wire 100 and its associated insulation system may have a PDIV that is greater than or equal to 3.5 times the insulation thickness in microns plus 1,200. In other words, the PDIV may satisfy the equation:

$$PDIV \geq 3.5(\text{insulation thickness}(\mu m)) + 1200$$

As a result of the relatively high dielectric strength and PDIV, the magnet wire 100 may be used in applications that demand higher electrical performance.

Figure 7:
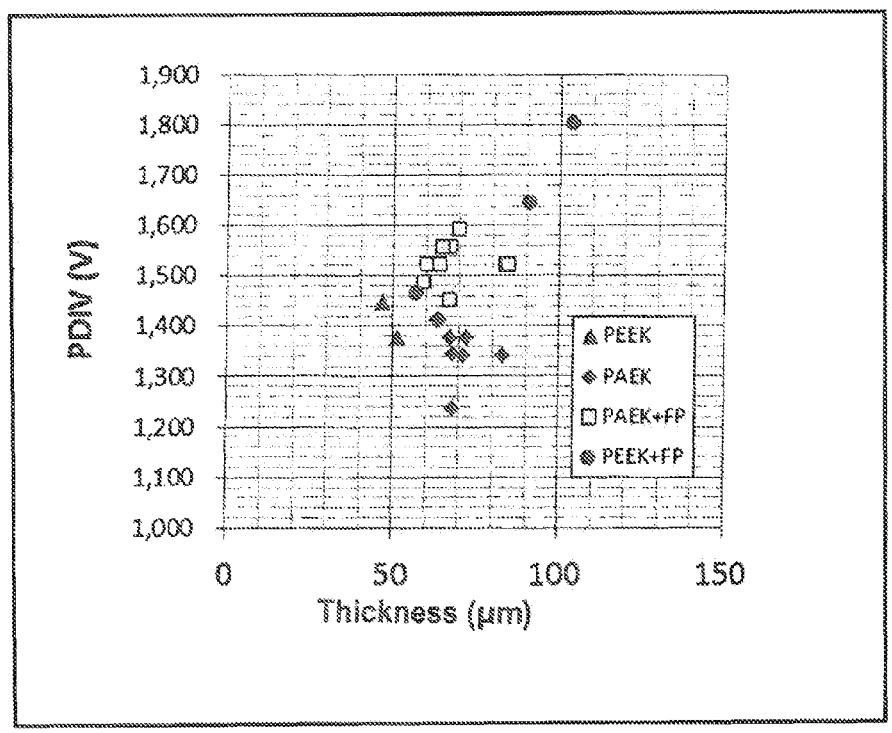
FIG. 7 depicts a chart illustrating measured PDIV values for example magnet wires, in accordance with an illustrative embodiment of the disclosure.

Additionally, in certain embodiments, the use of a fluorinated polymer (e.g., PEEK-FP, etc.) in an extruded layer may result in a higher PDIV relative to non-fluorinated extruded layers. FIG. 7 depicts a chart 700 illustrating measured PDIV values for several example magnet wire constructions, including constructions having non-fluorinated extruded layers and constructions that make use of fluorinated polymers in extruded layers. With reference to FIG. 7, PDIV values are plotted for various insulation thicknesses for four different magnet wire constructions: (1) a magnet wire construction with extruded PEEK insulation; (2) a magnet wire construction with extruded PAEK insulation; (3) a magnet wire construction with extruded PEEK-FP insulation; and (4) a magnet wire construction with extruded PAEK-FP insulation. The insulation thickness values, which are plotted in microns, correspond to the thinnest spots or areas in the insulation systems of the magnet wires. FIG. 7 clearly illustrates that magnet wire insulation systems incorporating extruded materials that have polymers containing a ketone group and a fluoropolymer have relatively higher PDIV values compared to insulation systems that do not incorporate fluoropolymers. For example, an insulation system containing an extruded PEEK-FP material has higher measured PDIV values than an insulation system containing an extruded PEEK material. As another example, an insulation system containing an extruded PAEK-FP material has higher measured PDIV values than an insulation system containing an extruded PAEK material. Additionally, in certain embodiments, the use of extruded layer constructions incorporating fluorinated polymers may result in improved PDIV performance relative to non-fluorinated materials over an entire operating range of an electric machine (e.g., motor, generator, etc.) incorporating the magnet wire 100. This improved PDIV performance may result at least in part from the lower dielectric constant values of the extruded layer 115 and/or overall insulation.

With continued reference to FIG. 1, in the event that other insulation layers (e.g., enamel layer(s), tape(s), semi-conductive layer(s), other extruded layers, etc.) are combined with one or more extruded layers containing a ketone group and fluoropolymer, the resulting insulation system may be designed and/or customized to have a wide variety of suitable properties. For example, the overall dielectric constant of the insulation system, as well as the dielectric constants of any number of the layers of the insulation system, may be adjusted or customized (e.g., via material selection, etc.) to any desirable values. In certain embodiments, the customization of dielectric constants may result in improving the PDIV of the magnet wire 100 over a wide range of temperatures, such as temperatures between approximately 25° C. and approximately 250° C.

Additionally, in certain embodiments, the magnet wire 100 may have a relatively high thermal rating. In other words, the magnet wire 100 may be suitable for relatively continuous use at elevated temperatures without the insulation breaking down. According to an aspect of the disclosure, the magnet wire 100 may be suitable for relatively continuous use at temperatures up to approximately 220° C. without degradation of the insulation. In certain embodiments, the magnet wire 100 may be suitable for relatively continuous use at temperatures up to approximately 230° C., approximately 240° C., or higher. The term relatively continuous use may refer to a suitable time period that may be used to test the integrity of the magnet wire 100, such as a time period of 1,000 hours, 5,000 hours, 20,000 hours or a time period determined from an applicable standard (e.g., ASTM 2307, etc.). In an example test procedure, the magnet wire 100 may be subjected to an elevated operating temperature for a given time period and, following the time period, the integrity of the insulation (e.g., dielectric strength, PDIV, etc.) may be tested.

In certain embodiments, the insulation system of the magnet wire 100 may be resistant to ultraviolet ("UV") light damage and, more particularly, to UV light damage (e.g., damage resulting from light having a wavelength between approximately 300 nm and approximately 400 nm, etc.) during a partial discharge microburst event. As set forth above, partial discharge inception events are known to contribute to premature failure of magnet wire insulation. In some partial discharge events (e.g., events in which crackling sounds arise, etc.), miniature lightning bolt events that cause miniature thunderclaps occur within micro volumetric spaces in and around an insulation layer. These events may produce multiple microbursts of UV radiation within these volumetric spaces. The insulation system described herein may be resistant to damage caused by UV radiation and/or any associated microburst events at elevated temperatures. In other words, the insulation system will be relatively more resistant to breakdown in the presence of UV radiation.

By contrast, certain conventional magnet wire insulation system may result in insulation breakdown during UV microburst events. For example, U.S. Pat. No. 8,586,869 describes a magnet wire insulation system that includes an outer layer of extruded polyphenylene sulfide (PPS). However, corona discharges at or around the insulation, such as corona discharges in the presence of air, may lead to the production of relatively large amounts of UV radiation. The UV radiation may be detrimental to the PPS insulation, making the PPS insulation less desirable for application with higher frequency PDIV events. More specifically, the cyclization reaction caused by the UV radiation results in a new carbon-carbon bond formation with the creation of an intermediate tetravalent sulfur species in the PPS. The intermediate tetravalent sulfur species will either rearrange or be trapped by another moiety with a double bond. Because the new resulting polymer linked entities have additional junction points, the resulting polymer will lose elasticity. As a result, the affected PPS insulation will no longer be malleable and may crack and/or shatter.

Additionally, in certain embodiments, the magnet wire 100 and associated insulation system may be hydrolytically stable and resistant to oils and/or liquids, such as transmission fluid. In certain embodiments, the extruded layer 115 may protect the base coat 110, thereby permitting the magnet wire to be directly in contact with or submerged in oil, automatic transmission fluid, and/or similar lubricants or fluids. The magnet wire 100 may be capable of satisfying a wide variety of oil resistance tests, such as the oil bomb test set forth in the American Society for Testing and Materials ("ASTM") D1676-03 standard entitled "Resistance to Insulating Liquids and Hydrolytic Stability of Film-Insulated Magnet Wire." Under the test, a magnet wire is exposed to oil or another liquid at an elevated temperature (e.g., a temperature of 150° C. for approximately 2000 hours, etc.) in order to simulate actual use conditions and/or accelerated aging of the wire. After completion of the test, the wire is again tested for dielectric breakdown, PDIV, and a visual inspection for cracking may be performed.

The magnet wire 100 and associated insulation may also be relatively flexible while maintaining adhesion of the insulation layers (i.e., adhesion of a base layer to the conductor, adhesion of insulation layers to one another, etc.), thereby permitting the magnet wire 100 to be bent or formed into relatively tight coils without the insulation cracking and/or separating. The magnet wire 100 may be capable of satisfying a wide variety of suitable flexibility test procedures, such as the test procedure 3.3.6 set forth in the National Electrical Manufacturers Association ("NEMA") MW 1000-2012 standard. In one example test, a specimen of the magnet wire 100 (e.g., a one meter long sample, etc.) may be elongated by approximately 25%. The sample may then be bent at least approximately 90° around a mandrel having a diameter of approximately 4.0 mm. After the bending, the sample may be inspected for cracks in the insulation. Additionally, the sample may be tested for dielectric breakdown, PDIV, and/or other desired performance characteristics.

The magnet wire 100 may also be resistant to softening. As a result, the magnet wire 100 may satisfy a wide variety of softening or cut-through tests, such as the test set forth by Japanese Industrial Standard ("JIS") C 3216-6:2011(E). Under the test, a specific load may be applied to a wire and the temperature may be raised. A determination may then be made as to the temperature at which a short circuit will occur through the insulation. In certain embodiments, the magnet wire 100 may satisfy temperatures of up to 300° C., up to 400° C., up to 500° C., or a temperature greater than 500° C. Typically, the magnet wire 100 will satisfy a temperature requirement between approximately 300° C. and approximately 400° C. without a short occurring. In certain embodiments, the magnet wire 100 may also be resistant to abrasion and/or damage caused by objects scuffing, wearing down, marring, or rubbing on the magnet wire 100.

The use of extrudable materials that include a combination of at least one polymer containing ketone group(s) and fluoropolymers may also result in a magnet wire with enhanced or improved friction properties. For example, the use of PEEK-FP or PAEK-FP may result in improved friction properties over a magnet wire that simply uses PEEK or PAEK as an extruded material. In certain embodiments, an extruded layer 115 may have a static coefficient of friction ("COF") that is below approximately 0.25, such as a static COF below approximately 0.20 or a static COF below approximately 0.15. In some cases, the extruded layer 115 may have a static COF below approximately 0.10.

A magnet wire 100 formed in accordance with embodiments of the disclosure may be suitable for a wide variety of applications. For example, the magnet wire may be suitable for use in automobile motors, starter generators for hybrid electric vehicles and/or electric vehicles, alternators, etc. The insulation system may permit the magnet wire 100 to satisfy relatively stringent electrical performance characteristics (e.g., dielectric strength requirements, PDIV requirements, etc.) while being sufficiently thin to allow a relatively tight packing or coiling of the magnet wire 100. As a result, the performance and/or output of an electrical machine formed using the magnet wire 100 (e.g., a rotary electrical machine, etc.) may be enhanced relative to machines formed utilizing conventional magnet wire.

The magnet wire 100 described above with reference to FIG. 1 is provided by way of example only. A wide variety of alternatives could be made to the illustrated magnet wire 100 as desired in various embodiments. For example, a base layer 110 may be formed with any number of sublayers. As another example, the cross-sectional shape of the magnet wire 100 and/or one or more insulation layers may be altered. Indeed, the present disclosure envisions a wide variety of suitable magnet wire constructions.

FIGS. 2A-2F illustrate example cross-sectional views of example magnet wires 200, 210, 220, 230, 240, 250 that may be formed in accordance with certain embodiments of the disclosure. Each of the example magnet wires 200, 210, 220, 230, 240, 250 includes a different insulation system. Additionally, the components of each example insulation system are described in greater detail above with reference to FIG. 1. Turning first to FIG. 2A, a first example magnet wire 200 is illustrated. The magnet wire 200 may include a conductor 202, and one or more layers of enamel 204 may form a base layer of polymeric insulation. A thermoplastic top coat 206 may then be extruded over the enamel 204.

FIG. 2B illustrates a cross-sectional view of another example magnet wire 210. The magnet wire 210 may include a conductor 212, and a polymeric tape (e.g., a polyimide tape) 214 may be formed or wrapped around the conductor 212. A thermoplastic top coat 214 may then be extruded over the tape 212. FIG. 2C illustrates a cross-sectional view of another example magnet wire 220. The magnet wire 220 may include a conductor 222, and one or more layers of enamel 224 may be formed around an outer periphery of the conductor 222. A polymeric tape 226 may then be wrapped around the enamel 224, and a thermoplastic top coat 228 may be extruded over the tape 226. FIG. 2D illustrates an example magnet wire 230 in which a semi-conductive layer 232 is formed around a conductor 234 A base layer 236 and extruded layer 238 are then formed on the semi-conductive layer 232. FIG. 2E illustrates an example magnet wire 240 in which a semi-conductive layer 242 is formed around a conductor 244, and an extruded layer 246 is then formed on the semi-conductive layer 242. FIG. 2F illustrates an example magnet wire 250 in which an extruded layer 252 is formed directly on a conductor 254.

A wide variety of other suitable magnet wire constructions may be formed as desired in various embodiments of the disclosure. These constructions may include insulation systems with any number of layers and/or sublayers. Additionally, the insulation systems may be formed from a wide variety of suitable materials and/or combinations of materials. The magnet wire constructions illustrated in FIGS. 2A-2F are provided by way of non-limiting example only.

As set forth above, a magnet wire and/or various insulation layers of a magnet wire may be formed with a wide variety of suitable cross-sectional shapes. FIGS. 3A-3F illustrate example cross-sectional shapes that may be utilized for magnet wire in accordance with various illustrative embodiments of the disclosure. Although the shapes in FIGS. 3A-3F are illustrated as conductor shapes, it will be appreciated that similar shapes and/or outer peripheries may be utilized for various insulation layers.

Figure 3A:
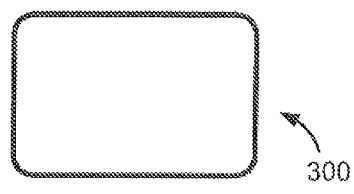
FIGS. 3A-3F illustrate example cross-sectional shapes that may be utilized for magnet wire in accordance with various illustrative embodiments of the disclosure.
Figure 3B:
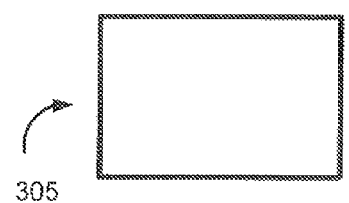
Figure 3C:
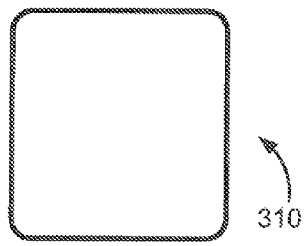
Figure 3D:
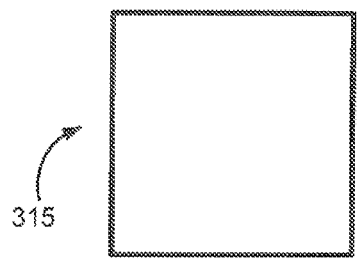
Figure 3E:
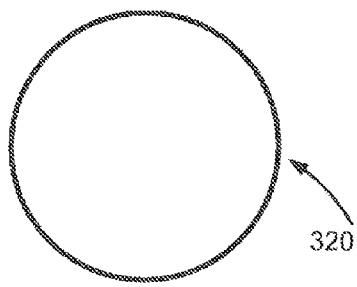
Figure 3F:
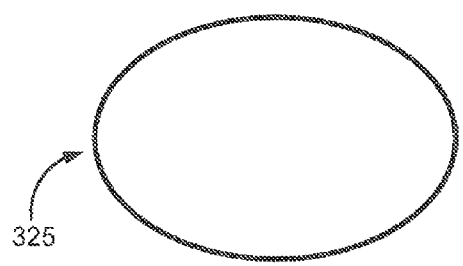

Turning first to FIG. 3A, a first example magnet wire 300 is illustrated as having an approximately rectangular cross-sectional shape. As shown, the corners of the magnet wire 300 may be rounded, blunted, or truncated. FIG. 3B illustrates a second example magnet wire 305 having a rectangular or approximately rectangular cross-section with relatively sharp corners. FIG. 3C illustrates a third example magnet wire 310 having an approximately square cross-sectional shape with rounded corners. FIG. 3D illustrates a fourth example magnet wire 315 having a square or approximately square cross-sectional shape with relatively sharp corners. FIG. 3E illustrates a fifth example magnet wire 320 having a circular cross-sectional shape, and FIG. 3F illustrates a sixth example magnet wire 325 having an elliptical or oval cross-sectional shape. Other cross-sectional shapes may be utilized as desired, and the shapes illustrated in FIGS. 3A-3F are provided by way of non-limiting example only.

Figure 4:
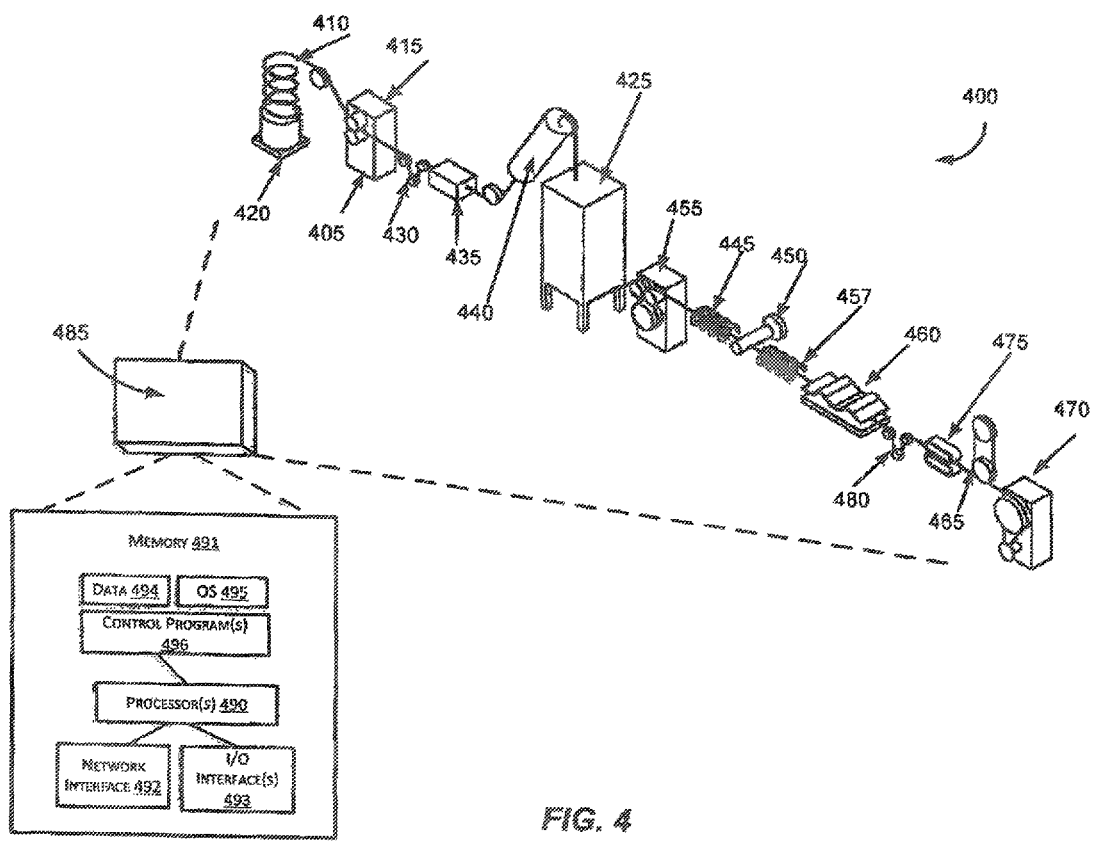
FIG. 4 illustrates a first example system that may be utilized to form magnet wire in accordance with various embodiments of the disclosure.
Figure 5:
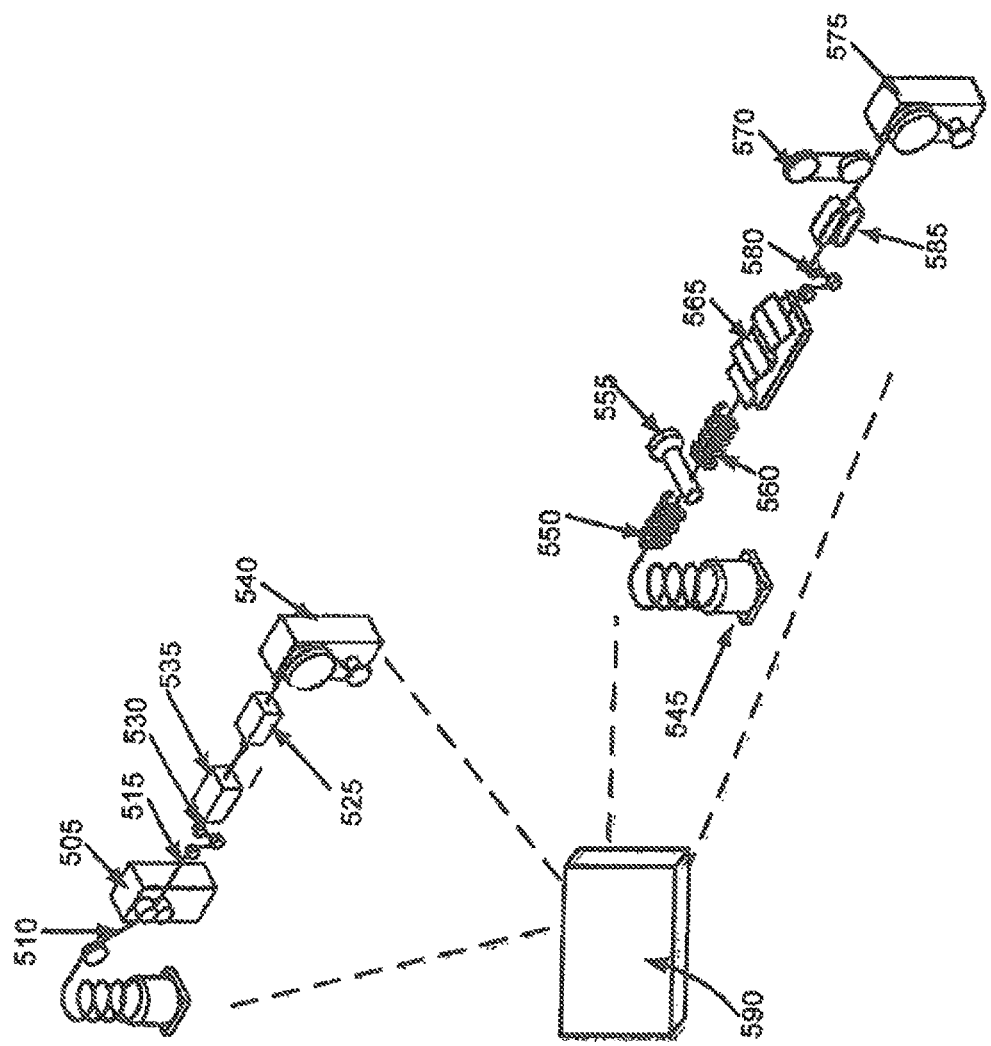
FIG. 5 illustrates a second example system that may be utilized to form magnet wire in accordance with various embodiments of the disclosure.

A wide variety of suitable methods and/or techniques may be utilized as desired to produce magnet wire in accordance with various embodiments. In conjunction with these manufacturing techniques, a wide variety of suitable equipment, systems, machines, and/or devices may be utilized. FIGS. 4 and 5 illustrate two example systems 400, 500 that may be utilized to form magnet wire in accordance with various embodiments of the disclosure. These example systems 400, 500 will be discussed below in conjunction with FIG. 6, which illustrates an example method 600 for forming magnet wire. Although the method 600 of FIG. 6 discusses the formation of a multi-layer insulation system that includes both one or more base layers and one or more extruded layers, it will be appreciated that an insulation system may be formed without the base layer(s) in certain embodiments.

Figure 6:
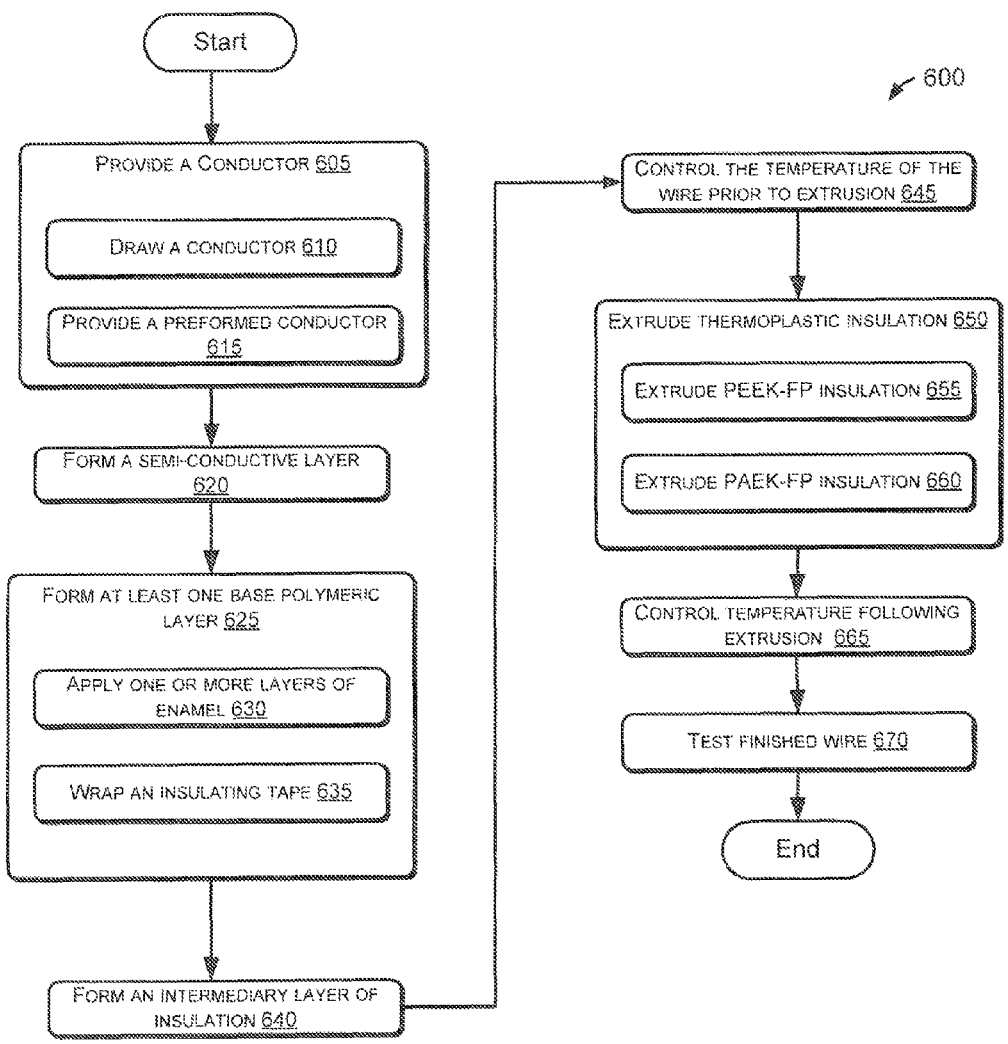
FIG. 6 illustrates a flow chart of an example method for forming magnet wire, in accordance with an illustrative embodiment of the disclosure.

Turning to FIG. 6, the method 600 for forming magnet wire may begin at block 605. At block 605, a magnet wire conductor may be provided 605 in accordance with a wide variety of suitable techniques and/or utilizing a wide variety of suitable wire formation systems. For example, at block 610, a conductor may be drawn from a suitable input material (e.g., a larger diameter conductor). Both the systems 400, 500 of FIGS. 4 and 5 illustrate wire forming devices 405, 505 (also referred to as wire forming components or wire forming systems) configured to receive input material 410, 510 and process the received input material 410, 510 to form a conductor 415, 515 with desired dimensions. Each wire forming device 405, 505 may include one or more dies through which the input material 410, 510 is drawn in order to reduce the size of the input material 410, 510 to desired dimensions. Additionally, in certain embodiments, one or more flatteners and/or rollers may be used to modify the cross-sectional shape of the input material 410, 510 before and/or after drawing the input material 410, 510 through any of the dies. For example, rollers may be used to flatten one or more sides of input material 410, 510 in order to form a rectangular or square wire.

In certain embodiments, a wire forming device 405, 505 may include any number of suitable capstans and/or other devices that pull the input material 410, 510 through the dies and/or rollers. In other embodiments, one or more separate devices, such as a separate capstan, may draw the input material 410, 510 through a wire forming device 405, 505. As desired, any number of motors may be utilized to power capstans, dancers, and/or other devices that exhibit a drawing force on the input material 410, 510 and/or the conductor 415, 515 output by the wire forming device 405, 505. Additionally, the motors may be controlled by any number of suitable controllers and, as desired, synchronized with other components of the respective systems 400, 500.

In certain embodiments, each wire forming device 405, 505 may receive input material 410, 510 from one or more suitable payoffs 420, 520 or other sources of preformed material. In other embodiments, a wire forming device 405, 505 may receive input material 410, 510 from other processing devices or machines in a continuous or tandem manner. For example, a wire forming device 405, 505 may receive input material from a suitable rod mill or rod breakdown machine (not shown). A rod mill may draw rod stock through one or more dies in order to reduce the dimensions of the rod stock. As desired, a rod mill may also include one or more flatteners and/or rollers. A rod mill may include any number of capstans that pull or draw the rod stock through the dies. In certain embodiments, each capstan may be powered by an individual motor. Alternatively, a given motor may power any subset of the capstans. As desired, the motors may be controlled and/or synchronized by one or more suitable controllers. Additionally, in certain embodiments, operation of the rod mill may be synchronized with the wire forming device 405, 505. Further, a wide variety of other suitable devices may be positioned between the rod mill and the wire forming device 405, 505, such as an annealer and/or one or more wire cleaning devices.

In other embodiments, a wire forming device 405, 505 may receive input material 410, 510 from a suitable continuous extrusion or conform machine (not shown). For example, a conform machine may receive rod stock (or other suitable input material) from a payoff or other source, and the conform machine may process and/or manipulate the rod stock to produce a desired conductor via extrusion. The conductor produced by the conform machine may then be provided to the wire forming device 405, 505 for further processing. As desired, operation of the conform machine and wire forming device 405, 505 may be synchronized via one or more suitable controllers.

As yet another example of providing a conductor, at block 615, a preformed conductor may be provided or received from a suitable payoff or source. In other words, a conductor may be preformed in an offline process or obtained from an external supplier. Thus, it is not necessary to provide a wire forming device 405, 505. The conductor may have any suitable dimensions as specified for a desired magnet wire product.

At block 620, which may be optional in certain embodiments, one or more semi-conductive layers may be formed around the conductor. A semi-conductive layer may include semi-conductive and/or conductive material that may assist in equalizing voltage stresses and/or dissipating corona discharges. In certain embodiments, a semi-conductive layer may be formed on the conductor in a similar manner to an enamel layer. In other embodiments, a semi-conductive layer may be extruded onto the conductor. In yet other embodiments, a semi-conductive tape may be wrapped around the conductor.

At block 625, which may be optional in certain embodiments, one or more base layers of polymeric insulation may be formed around the conductor or any preexisting layer. For example, at least one base polymeric layer may be formed directly on the conductor. As another example, at least one base polymeric layer may be formed on a semi-conductive layer. The base layer may be formed from a wide variety of suitable materials and/or combinations of materials. In certain embodiments, as set forth in block 630, a base layer may be formed by applying one or more layers of enamel to a conductor. The system 400 of FIG. 4 illustrates an example enamel formation process. A conductor 415, such as a conductor exiting a wire forming device 405, may be passed through one or more suitable components 425 that apply an enamel layer to the conductor 415. As shown, the conductor 415 may be passed through an enameling oven 425. In certain embodiments, one or more dies may be incorporated into the enameling oven 425, and varnish may be applied to the conductor 415 as it is passed through the die(s). In other embodiments, the conductor 415 may be passed through one or more varnish application dies prior to entering the enameling oven 425. In yet other embodiments, varnish may be dripped onto the conductor 415 either prior to or after the conductor 415 enters the enameling oven 425. After application of the varnish, the enameling oven 425 may heat cure the varnish and/or evaporate any solvents mixed or blended with the varnish in order to complete the formation of an enamel layer.

The process for applying an enamel layer to the conductor 415 may be repeated as many times as desired in order to obtain a desired enamel build thickness. In other words, additional varnish may be applied to the conductor 415 and, after each application (or series of applications), the conductor 415 may be heated in the enameling oven 425 until a desired enamel build is attained.

Additionally, with continued reference to FIG. 4, once the conductor 415 exits the wire forming device 405, the conductor 415 may be passed through any number of other components prior to reaching the enameling oven 425. For example, upon exiting the wire forming device 405, the conductor 415 may be passed through one or more synchronization devices 430, such as one or more dancers (as illustrated), flyers, capstans, and/or load cells. The synchronization device(s) 430 may be controlled by one or more suitable controllers in order to match or approximately match an operational speed of the wire forming device 405 to that of the enameling oven 425. In this regard, wire formation and enameling may be carried out in a continuous or tandem fashion. In other words, the conductor 415 may not be taken up between the drawing and enameling processes. In other embodiments, a conductor 415 may be taken up after it exits the wire forming device 405, and the conductor 415 may subsequently be provided via a payoff to another device (e.g., an enameling oven, a wrap applicator, etc.) that forms a base layer of polymeric insulation in an offline manner.

With continued reference to FIG. 4, as desired in various embodiments, the conductor 415 may be passed through one or more cleaning apparatus 435 and/or an annealer 440 prior to entering the enameling oven 425. The cleaning apparatus 435 may wipe or otherwise remove residual particles from the conductor 415 following the drawing process. The annealer 440 may soften the conductor 415 by heat treatment in order to achieve desired tensile strength, elongation, and/or spring back.

As another example of applying a base polymeric layer, at block 635, a suitable insulating tape may be wrapped or otherwise formed around a conductor. The system 500 of FIG. 5 illustrates a conductor 515 being provided to a wrap applicator 525 after the conductor 515 exits the wire forming device 505. The wrap applicator 525 may wind or wrap a suitable polymeric tape, such as a polyimide tape with FEP formed on each side, around the conductor 515. Additionally, similar to the system 400 illustrated in FIG. 4, the wrapping process may be formed in tandem with the conductor formation process. In other embodiments, the conductor 515 may be taken up following the conductor formation process and later provided via a suitable payout to the wrap applicator 525.

Additionally, similar to the system 400 illustrated in FIG. 4, a conductor 515 may optionally be processed by one or more synchronization devices 530, cleaning apparatus 535, annealers (not shown) and/or other devices prior to winding or wrapping of a polymeric tape. Each of these devices may be similar to those described above with reference to FIG. 4.

At block 640, which may be optional in certain embodiments, one or more intermediary layers of insulation may be formed around the base layer(s) of insulation. For example, both enamel layers and a tape layer may be formed around a conductor. It will be appreciated that the systems 400, 500 of FIGS. 4 and 5 may be modified in order to facilitate the formation of any number of base and/or intermediary layers of insulation. For example, a system may be formed that includes both an enameling oven and a wrap applicator. As another example, a system may be formed that includes a plurality of enameling ovens.

Following the application or formation of one or more semi-conductive layers, base layers and/or intermediary layers of insulation, a top coat or outer layer of thermoplastic insulation may be formed. Alternatively, a top coat of extruded insulation may be formed directly on a bare conductor. In certain embodiments, as illustrated in block 645, the temperature of the conductor or magnet wire may be controlled prior to the extrusion process. For example, as illustrated in FIG. 4, the conductor 415 may be passed through one or more heating devices 445 in order to attain a desired temperature prior to the extrusion process. The heating devices 445 may include any suitable devices configured to increase or raise the temperature of the conductor 415, such as one or more heating coils, heaters, ovens, etc. As necessary, on or more cooling devices may also be utilized. The temperature of the conductor may be adjusted or controlled to achieve a wide variety of suitable values prior to extrusion. For example, in certain embodiments, the temperature may be controlled to approximately 200° C. or greater prior to extrusion. As another example, temperature may be controlled to approximately 400° F. or greater prior to extrusion. Controlling or maintaining the temperature at this level may facilitate adhesion between the extruded thermoplastic layer and the underling insulation materials. In this regard, the use of a separate adhesive layer may be avoided.

The system of FIG. 4 illustrates a system 400 in which a conductor is provided from an enameling oven 425 directly to an extrusion process (e.g., the illustrated heating devices 445 and subsequent extrusion devices 450) in a tandem or continuous manner. As desired, one or more synchronization devices 455 may be utilized to synchronize the enameling and extrusion processes. As shown in FIG. 4, a suitable capstan may be utilized as a synchronization device, and the capstan may be configured to pull the conductor 405 out of the enameling oven 425 for provision to the extrusion process. In other embodiments, the synchronization device(s) 455 may include one or more dancers, flyers, capstans, load cells, and/or combinations thereof. Additionally, as desired in various embodiments, the synchronization device(s) 455 may be controlled by one or more suitable controllers in order to match or approximately match an operational speed of the enameling oven 425 and the extrusion process. Alternatively, the speeds of other devices in the system 400 may be synchronized with the speed of a capstan. In this regard, enameling and extrusion may be carried out in a continuous or tandem fashion. In other words, the conductor 415 may not be taken up between the enameling and extrusion processes. In other embodiments, a conductor 415 may be taken up after it exits the enameling oven 425, and the conductor 415 may subsequently be provided via a payoff to an extrusion process.

In contrast to the system of FIG. 4, FIG. 5 illustrates a system 500 in which a conductor 515 is supplied to a take-up device 540 following application of one or more base and/or intermediary layers of insulation. The conductor 515 may then be supplied by a suitable payoff device 545 to an extrusion process that includes one or more heating/cooling devices (e.g., the illustrated heating device 550) that control the temperature of the conductor 515 prior to application of an extruded layer. It will be appreciated that either system 400, 500 may perform the application of base insulation and extruded insulation in either a tandem process or, alternatively, in two separate processes in which the conductor is taken up in between. In the event that a tandem process is utilized, the speeds of the components that apply base insulation and the extrusion components may be controlled and/or synchronized. In certain embodiments, the processes of providing a conductor, applying a semi-conductive layer, applying base insulation, and/or applying an extruded layer may be performed in a tandem or continuous process. Accordingly, the speeds of all of the various subprocesses may be controlled and/or synchronized.

The thermoplastic insulation may be extruded onto the conductor at block 650. According to an aspect of the disclosure, the extruded thermoplastic insulation may include a suitable material that combines a substance having at least one ketone group and a fluoropolymer. For example, as illustrated at block 655, in certain embodiments, the extruded thermoplastic insulation may include a suitable PEEK-FP material. Alternatively, as illustrated at block 660, the extruded thermoplastic insulation may include a suitable PAEK-FP material in other embodiments. Other suitable materials may be utilized as desired in other embodiments. In yet other embodiments, the thermoplastic insulation may include a combination of PEEK-FP and PAEK-FP materials (and/or other suitable ketone group/fluoropolymer materials), a combination of PEEK-FP and/or PAEK-FP (or other suitable ketone group/fluoropolymer materials) with other suitable thermoplastic materials, and/or any other suitable materials that achieve desirable insulation results. As desired, a single extruded layer or multiple extruded layers may be formed. For example, PEEK-FP, PAEK-FP, or other suitable ketone group/fluoropolymer material may be formed over another extruded thermoplastic (e.g., PEEK, PAEK, etc.), under another extruded thermoplastic, or between two other layers of thermoplastic material(s). Both the systems 400, 500 of FIGS. 4 and 5 illustrate extrusion devices 450, 555 that are configured to extrude thermoplastic insulation as a top coat. These devices 450, 555 may include any number of suitable extrusion heads and/or other devices configured to apply a desired amount of thermoplastic insulation. As desired, the flow rates of the extruded insulation may be controlled in order to obtain a desired thickness. Additionally, in certain embodiments, one or more extrusion dies may be utilized to control the thickness and/or shape of the extruded insulation. Further, in certain embodiments, multiple materials may be co-extruded.

Although not illustrated in FIG. 6, in certain embodiments, one or more semi-conductive layers may be formed on top of an extruded thermoplastic layer. In other words, a semi-conductive layer may be formed as a top coat. A semi-conductive layer may be formed in a process similar to that utilized to form an enamel layer or, alternatively, a semi-conductive layer may be extruded. In the event that a semi-conductive layer is extruded, the semi-conductive layer may be co-extruded along with the thermoplastic extruded layer or, alternatively, extruded in a subsequent operation. Additionally, a top coat semi-conductive layer may assist in dissipating corona discharges and/or equalizing voltage stresses. In this regard, the PDIV of the finished magnet wire may be increased.

At block 665, the temperature of the conductor and associated extruded insulation may be controlled following the extrusion process. In certain embodiments, the extruded insulation may be heated following extrusion. This heating may maintain a desired post-extrusion temperature and/or assist in attaining a desired crystallinity. Additionally, in certain embodiments, the process of cooling the extruded insulation prior to taking up the finished magnet wire may be controlled. As a result of controlling the cooling rate of the extruded insulation, desirable characteristics may be achieved on the top coat. For example, a desired crystallinity of the extruded top coat may be achieved.

Both the systems 400, 500 of FIGS. 4 and 5 illustrate suitable heating devices 457, 560 and cooling devices 460, 565 that may be utilized to control the temperature of magnet wire once it exits associated extrusion devices 450, 555. The heating devices 457, 560 may include any suitable devices and/or systems configured to raise the temperature of the magnet wire following extrusion, such as heating coils, heaters, ovens, etc. The cooling devices 460, 565 may include any suitable devices and/or systems configured to lower the temperature of the finished magnet wire prior to take-up. In certain embodiments, the cooling devices 460, 565 may include a quencher or liquid bath (e.g., a water bath) through which the magnet wire may be passed in order to cool. The temperature of the liquid in the bath may be controlled via recycling liquid. Additionally, the cooling rate may be controlled as a function of controlling the liquid temperature and/or establishing a desired length of the quencher.

Following cooling of the extruded layer, the finished magnet wires may be provided to suitable accumulators and take-up devices, such as the accumulators 465, 570 and take-up devices 470, 575 illustrated in FIGS. 4 and 5. These devices may, for example, apply tension to the wire, bundle, the wire, and/or wind the finished wire onto a spool. As desired, one or more synchronization devices may be provided between the extrusion process and the accumulators 465, 570. For example, one or more dancers 475, 580 and/or capstans 480, 585 may be provided. These synchronization devices may be configured to exert a force on the conductors and/or finished magnet wire in order to pull the conductors through the extrusion devices and/or to match the take-up speed with that of the extrusion process. Additionally, in certain embodiments, the synchronization devices may be controlled by one or more controllers in order to synchronize the extrusion process and the take-up process.

In certain embodiments, as set forth at block 670, a wide variety of different tests may be performed on the finished wire. Certain tests may be performed in an in-line process prior to taking up the finished wire. For example, one or more measurement devices (e.g., optical measurement devices, sensor dies, laser measurement devices, etc.) may monitor the thickness and/or concentricity of the extruded top coat. Similar measurement devices may be provided at other points within a manufacturing system, for example, to test conductors for desired dimensions, to test applied enamel layers for desired thicknesses, dimensions, and/or beading, and/or to identify faults in a wrap layer. Other tests may be performed in an off-line process. For example, a technician may test a sample of wire for any desired electrical performance characteristics, such as a desired dielectric strength and/or a desired PDIV. A sample of wire may also be tested for oil resistance, temperature performance, abrasion resistance, resistance to mechanical forces, and/or flexibility via any number of suitable tests.

As set forth above, in certain embodiments, the various wire formation steps may be performed in a tandem or continuous process. In other embodiments, two or more of the formation steps may be performed in an offline or non-continuous process. For steps that are performed in tandem, it may be desirable to synchronize and/or otherwise control the processing speeds of various manufacturing components in order to facilitate wire processing. For example, the speeds of one or more motors that power individual capstans that pull the rod stock and/or conductor through the various manufacturing components may be controlled and/or synchronized.

In certain embodiments, one or more suitable controllers 485, 590 may be utilized to control certain operations of various components of a manufacturing system, such as the systems 400, 500 illustrated in FIGS. 4 and 5. For example, one or more controllers 485, 590 may facilitate synchronization of motors and/or line speeds within an associated manufacturing system 400, 500. As desired, a controller 485, 590 and/or combination of controllers may additionally control a wide variety of other parameters, such as the flow rate of an applied varnish, the temperature of an enameling oven, the wrapping rate of a wrap applicator, the temperature of various heating/cooling devices, the flow rate of an extrusion device, the temperature of liquid included in a quencher, and/or various testing conducted on a conductor and/or finished wire. Although a single controller is illustrated in each of FIGS. 4 and 5, any number of controllers may be utilized. Each controller may be a separate component or, alternatively, incorporated into another device or component. Additionally, any number of suitable communications channels (e.g., wired communications channels, wireless communications channels, etc.) may facilitate communication between a controller and one or more other components (e.g., one or more motors, another controller, other devices, etc.).

The system 400 of FIG. 4 illustrates the components of an example controller 485. It will be appreciated that the controller 590 illustrated in FIG. 5 may include similar components. Additionally, it will be appreciated that multiple controllers may be utilized as desired. With reference to FIG. 4, the controller 485 may include any number of suitable processor-driven devices that facilitate control of a magnet wire manufacturing system 400 or any number of components included in the system 400. In some example embodiments, the controller 485 may include one or more programmable logic controllers ("PLCs"); however, in other embodiments, a controller may include any number of server computers, networked computers, desktop computers, personal computers, laptop computers, mobile computers, microcontrollers, and/or other processor-based devices. The controller 485 may utilize one or more processors 490 to execute computer-readable or computer-executable instructions to facilitate the operations of the controller 485. As a result of executing these computer-executable instructions, a special-purpose computer or particular machine may be formed that facilitates the control of one or more components of a magnet wire manufacturing system 400 and/or synchronization of various components of the system 400.

In addition to having one or more processors 490, the controller 485 may further include one or more memory devices 491 (also referred to as memory 491), one or more network or communication interfaces 492, and/or one or more input/output ("I/O") interfaces 493 associated with corresponding input and output devices. The memory devices 491 may include any number of suitable memory devices, such as caches, read-only memory devices, random access memory devices, flash memory devices, magnetic storage devices, removable storage devices (e.g., memory cards, etc.), and/or non-removable storage devices. As desired, the memory devices 491 may include internal memory devices and/or external memory devices. The memory devices 491 may store data files 494, executable instructions, and/or various program modules utilized by the processors 490, such as an operating system (OS) 495 and/or one or more control programs 496.

Stored data files 494 may include any suitable data that facilitates the operation of the controller 485 and/or the interaction of the controller 485 with one or more other components of the system 400. For example, the stored data files 494 may include, but are not limited to, desired operating parameters for other components of the system 400, current speeds of various motors within the system 400, desired parameters for testing a conductor and/or finished magnet wire, stored test results, etc. The OS 495, which is optional in certain embodiments, may be a suitable module that facilitates the general operation of the controller 485, as well as the execution of other program modules, such as the control program(s) 496.

The control program(s) 496 may include any number of suitable software modules, applications, and/or sets of computer-executable instructions that facilitate the control and/or synchronization of various components of the system 400. In operation, the control program(s) 496 may monitor any number of measurements and/or operating parameters associated with the manufacturing system 400, such as motor speeds, measured temperatures, test data, etc. The control program(s) 496 may evaluate this data and take any number of suitable control actions based at least in part on the evaluations. For example, the control program(s) 496 may adjust the speeds of one or more motors to facilitate synchronization of the system 400. As another example, the control program(s) 496 may control the operation of one or more heating/cooling devices in order to maintain desired operating parameters. As yet another example, the control program(s) 496 may identify alert conditions, such as failed tests conditions, and take any number of suitable actions based upon the identified alert conditions, such as generating and/or communicating a suitable alert message and/or ceasing operation of the system 400 until the alert condition can be addressed.

The method 600 may end following block 670. The operations described and shown in the method 600 of FIG. 6 may be carried out or performed in any suitable order as desired in various embodiments. Additionally, in certain embodiments, at least a portion of the operations may be carried out in parallel. Furthermore, in certain embodiments, less than or more than the operations described in FIG. 6 may be performed.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An insulated winding wire comprising:
a conductor; and
insulation formed around the conductor, the insulation comprising:
a base insulation layer formed around the conductor, the base insulation layer having a first dielectric constant ($\epsilon 1$); and
an extruded thermoplastic layer formed around the base insulation layer and having a second dielectric constant ($\epsilon 2$), the extruded thermoplastic layer comprising (i) at least one polymer comprising a ketone group and (ii) at least one fluoropolymer,
wherein the ratio of the dielectric constant ($\epsilon 2$) of the extruded thermoplastic layer to the dielectric constant ($\epsilon 1$) of the base layer at 250° C. is less than approximately 1.0.

2. The insulated winding wire of claim 1, wherein the at least one polymer comprising a ketone group comprises at least one of polyetheretherketone (PEEK) or polyaryletherketone (PAEK).

3. The insulated winding wire of claim 1, wherein the at least one fluoropolymer comprises polytetrafluoroethylene.

4. The insulated winding wire of claim 1, wherein the extruded thermoplastic layer has a tensile modulus of at least 2.0 GPa.

5. The insulated winding wire of claim 1, wherein the extruded thermoplastic layer has a dielectric constant below approximately 3.2 at 25° C.

6. The insulated winding wire of claim 1, wherein the insulation has a dielectric constant below approximately 3.5 at 25° C.

7. The insulated winding wire of claim 1, wherein the insulation provides a partial discharge inception voltage greater than approximately 1,000 volts, a dielectric strength greater than approximately 7,500 volts, and wherein the insulation is capable of a continuous operating temperature of approximately 220° C. without degradation.

8. The insulated winding wire of claim 1, wherein the insulation has a partial discharge inception voltage greater than approximately 1,250 volts.

9. The insulated winding wire of claim 1, wherein the insulation has a partial discharge inception voltage greater than approximately 1,400 volts.

10. The insulated winding wire of claim 1, wherein the insulation has a partial discharge inception voltage that is greater than or equal to 3.5 times the insulation thickness in microns plus 1200.

11. The insulated winding wire of claim 1, wherein the insulation has a dielectric strength greater than approximately 10,000 volts.

12. The insulated winding wire of claim 1, wherein the base insulation layer comprises one or more layers of enamel.

13. The insulated winding wire of claim 12, wherein the one or more layers of enamel comprise at least one of (i)

polyimide, (ii) polyamideimide, (iii) amideimide, (iv) polyester, (v) polysulfone, (vi) polyphenylenesulfone, or (vii) polysulfide.

14. The insulated winding wire of claim 12, wherein the one or more layers of enamel comprise a thickness between approximately 0.001 inches (25 μm) and approximately 0.01 inches (254 μm).

15. The insulated winding wire of claim 1, wherein the extruded thermoplastic layer comprises a thickness between approximately 0.001 inches (25 μm) and approximately 0.024 inches (610 μm).

16. The insulated winding wire of claim 1, wherein the extruded thermoplastic layer is formed directly on the base insulation layer with substantially no bonding agent.

17. The insulated winding wire of claim 1, wherein the base insulation layer comprises a polymeric tape.

18. The insulated winding wire of claim 1, wherein the extruded thermoplastic layer comprises a plurality of layers of extruded material.

19. The insulated winding wire of claim 18, wherein a first of the plurality of layers of extruded material is formed of a first material that comprises at least one polymer comprising a ketone group and at least one fluoropolymer, and
wherein a second of the plurality of layers of extruded material is formed from a second material different than the first material.

20. The insulated winding wire of claim 1, wherein the total thickness of the insulation is less than approximately 0.0094 inches (240 μm).

21. The insulated winding wire of claim 1, wherein the insulation is capable of a continuous operating temperature of approximately 240° C. without degradation.

22. The insulated winding wire of claim 1, wherein the insulation maintains its electrical properties when the wire is bent ninety degrees around a mandrel having a diameter of approximately 4.0 mm.

23. The insulated winding wire of claim 1, wherein the insulation further comprises at least one layer of semi-conductive material.

24. The insulated winding wire of claim 1, wherein the insulation has a concentricity of less than approximately 1.3.

25. An insulated winding wire comprising:
a conductor; and
insulation formed around the conductor, the insulation providing a partial discharge inception voltage greater than approximately 1,400 volts, the insulation comprising:
at least one layer of enamel formed around an outer periphery of the conductor; and
an extruded thermoplastic layer formed around the enamel, the thermoplastic layer comprising (i) at least one polymer comprising a ketone group and (ii) at least one fluoropolymer,
wherein the ratio of the dielectric constant of the thermoplastic layer to the dielectric constant of the at least one layer of enamel is less than or equal to approximately 1.0 at 250° C.

26. The insulated winding wire of claim 25, wherein the at least one polymer comprising a ketone group comprises at least one of polyetheretherketone (PEEK) or polyaryletherketone (PAEK).

27. The insulated winding wire of claim 25, wherein the insulation has a partial discharge inception voltage that is greater than or equal to 3.5 times the insulation thickness in microns plus 1200.

28. The insulated winding wire of claim 25, wherein the at least one layer of enamel comprises at least one of (i) polyimide, (ii) polyamideimide, (iii) amideimide, (iv) polyester, (v) polysulfone, (vi) polyphenylenesulfone, or (vii) polysulfide.

29. The insulated winding wire of claim 25, wherein the extruded thermoplastic layer is formed directly on the at least one layer of enamel with substantially no bonding agent.

30. The insulated winding wire of claim 25, wherein the total thickness of the insulation is less than approximately 0.0094 inches (240 μm).

31. The insulated winding wire of claim 25, wherein the insulation has a concentricity of less than approximately 1.3.

32. A method for forming an insulated winding wire, the method comprising:
providing a conductor;
forming at least one base layer of insulating material around an outer periphery of the conductor; and
extruding a thermoplastic layer around the base layer, the thermoplastic layer comprising (i) at least one polymer comprising a ketone group and (ii) at least one fluoropolymer,
wherein the ratio of the dielectric constant of the thermoplastic layer to the dielectric constant of the at least one base layer is less than or equal to approximately 1.0 at 250° C.

33. The method of claim 32, wherein forming at least one base layer of insulating material comprises applying at least one layer of enamel onto the conductor.

34. The method of claim 33, wherein applying at least one layer of enamel comprises applying at least one layer of (i) polyimide, (ii) polyamideimide, (iii) amideimide, (iv) polyester, (v) polysulfone, (vi) polyphenylenesulfone, or (vii) polysulfide.

35. The method of claim 32, wherein extruding a thermoplastic layer comprises extruding a thermoplastic layer comprising at least one of polyetheretherketone (PEEK) or polyaryletherketone (PAEK).

36. The method of claim 32, wherein extruding a thermoplastic layer comprises extruding a thermoplastic layer with a concentricity less than approximately 1.3.

37. The method of claim 32, wherein extruding a thermoplastic layer comprises extruding a thermoplastic layer directly on the at least one base layer.

38. The method of claim 32, further comprising:
controlling, prior to extruding the thermoplastic layer, a temperature of the conductor and the at least one base layer to be at least 200° C.

39. The method of claim 32, wherein the forming and extruding are performed in a tandem process.

40. An electric machine comprising:
at least one winding of insulated wire, the insulated wire comprising:
a conductor; and
insulation formed around the conductor, the insulation comprising:
a base insulation layer formed around the conductor, the base insulation layer having a first dielectric constant ($\epsilon 1$); and
an extruded thermoplastic layer formed around the base insulation layer and having a second dielectric constant ($\epsilon 2$), the extruded thermoplastic layer comprising (i) at least one polymer comprising a ketone group and (ii) at least one fluoropolymer,
wherein the ratio of the dielectric constant ($\epsilon 2$) of the extruded thermoplastic layer to the dielectric constant ($\epsilon 1$) of the base layer at 250° C. is less than approximately 1.0.

* * * * *